(12) United States Patent
Matsumoto

(10) Patent No.: US 6,181,434 B1
(45) Date of Patent: Jan. 30, 2001

(54) PRINT CONTROL APPARATUS AND METHOD AND STORAGE MEDIUM STORING COMPUTER READABLE PROGRAMS

(75) Inventor: Masashi Matsumoto, Yokohama (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/038,962

(22) Filed: Mar. 12, 1998

(30) Foreign Application Priority Data

Mar. 12, 1997 (JP) ............................................. 9-056774
Mar. 9, 1998 (JP) ............................................ 10-056623

(51) Int. Cl.$^7$ ............................................... G06F 15/00

(52) U.S. Cl. ..................... 358/1.13; 358/1.15; 358/1.18

(58) Field of Search .................... 358/450, 451, 358/453, 467, 468, 442, 434, 296, 1.12, 1.18, 1.6, 1.13, 1.15, 1.14, 1.1; 395/734, 200.35, 553, 733; 707/910, 521, 517, 500, 522, 523, 524, 525, 515, 514, 104; 709/205, 400; 271/3.14, 3.16, 3.17; 710/261, 260

(56) References Cited

U.S. PATENT DOCUMENTS

| | | | |
|---|---|---|---|
| 5,163,125 | * 11/1992 | Okada | 358/1.16 |
| 5,511,149 | * 4/1996 | Hayano | 358/1.13 |
| 5,664,075 | * 9/1997 | Park et al. | 358/1.15 |
| 5,767,892 | * 6/1998 | Mikami | 347/264 |
| 5,799,111 | * 8/1998 | Guissin | 382/254 |

* cited by examiner

Primary Examiner—Dov Popovici
(74) Attorney, Agent, or Firm—Fitzpatrick, Cella, Harper & Scinto

(57) ABSTRACT

A print control apparatus capable of performing either a mixed print process or an independent print process in accordance with a print mode, the mixed print process printing sequentially received print data on the same recording sheet, and the independent print process printing print data next received on a new recording sheet after the previous recording sheet is ejected. If a sensor detects that a first recording sheet remains in a printer engine when second print data is received by an interface, a CPU controls to execute either the mixed print process or the independent print process in accordance with the set state of a first print mode set by a mode setter.

48 Claims, 14 Drawing Sheets

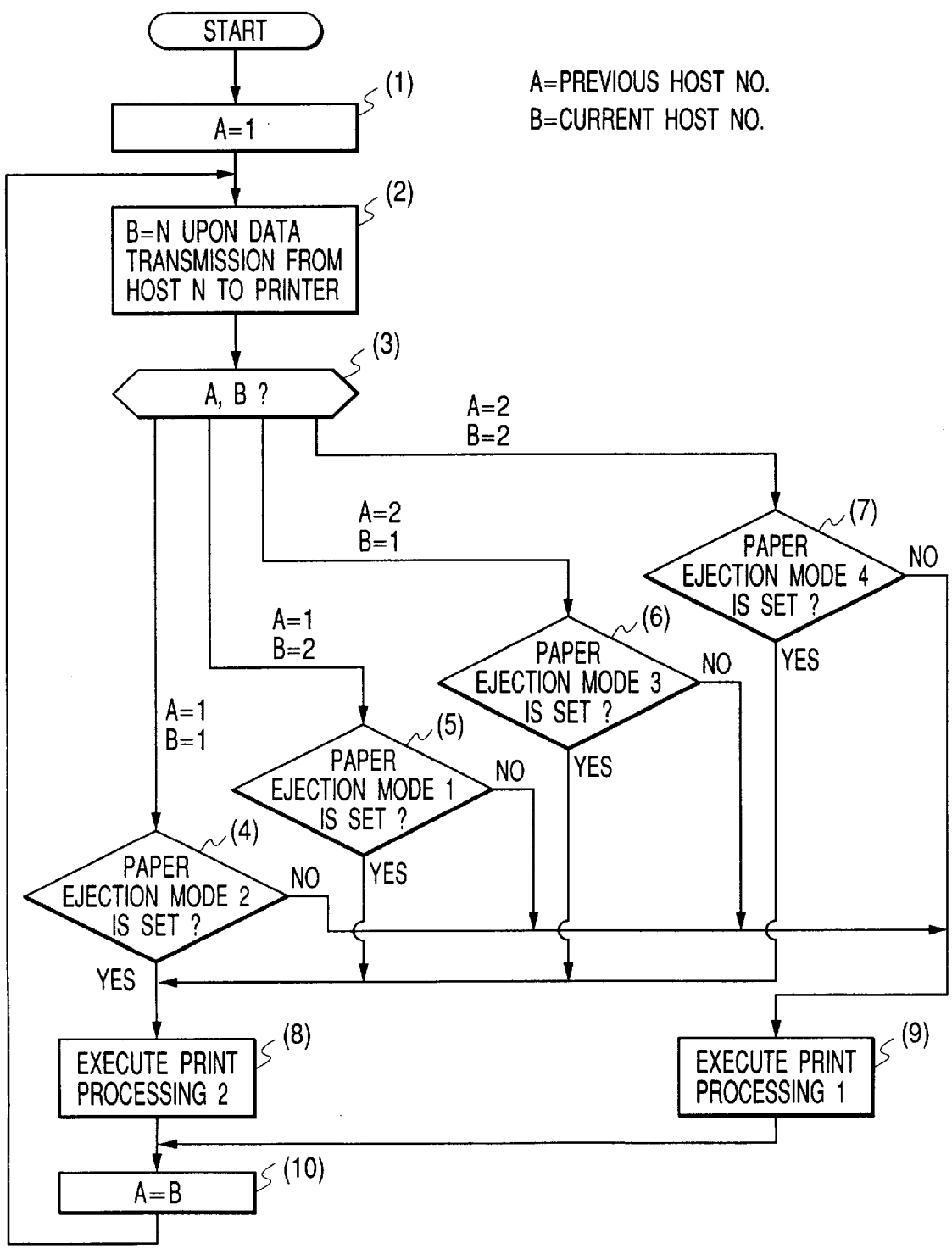

FIG. 8

MEMORY MEDIUM (FD/CD-ROM)

| DIRECTORY |
|---|
| FIRST DATA PROCESSING PROGRAM (PROGRAM CODE GROUP FOR FLOWCHART OF FIG. 3) |
| SECOND DATA PROCESSING PROGRAM (PROGRAM CODE GROUP FOR FLOWCHART OF FIG. 4) |
| THIRD DATA PROCESSING PROGRAM (PROGRAM CODE GROUP FOR FLOWCHART OF FIG. 5) |
| FOURTH DATA PROCESSING PROGRAM (PROGRAM CODE GROUP FOR FLOWCHART OF FIG. 6) |
| FIFTH DATA PROCESSING PROGRAM (PROGRAM CODE GROUP FOR FLOWCHART OF FIG. 7) |
| |

FIG. 15

| | COMMAND/DATA | PRINTER |
|---|---|---|
| FOR PRINT DATA A | PAPER FEED COMMAND | VALIDATE |
| | PRINT DATA | VALIDATE |
| | PAPER EJECT COMMAND | DISREGARD |
| FOR PRINT DATA B | PAPER FEED COMMAND | DISREGARD |
| | PRINT DATA | VALIDATE |
| | PAPER EJECT COMMAND | DISREGARD |
| FOR PRINT DATA C | PAPER FEED COMMAND | DISREGARD |
| | PRINT DATA | VALIDATE |
| | PAPER EJECT COMMAND | DISREGARD |

PRINT CONTROL APPARATUS AND METHOD AND STORAGE MEDIUM STORING COMPUTER READABLE PROGRAMS

BACKGROUND OF THE INVENTION

1. Field of the Invention

The present invention relates to a print control apparatus and a method of controlling a process of printing an image on a recording sheet in accordance with print data input via an interface, and a storage medium storing print control programs, and more particularly to a serial printer for printing information while a head as a print unit is reciprocally scanned and a recording sheet is transported in a direction perpendicular to the scan direction of the head.

2. Related Background Art

Printers of this type, particularly serial printers, are each equipped with a plurality of interfaces and perform a print process by automatically exchanging interfaces in accordance with reception conditions of print data, reciprocally scanning a head and transporting a recording sheet in a direction perpendicular to the scan direction of the head. A print process is also performed by receiving a printer control command and print data from a host computer, and a printed recording sheet is ejected upon reception of a paper ejection command to thereby complete a series of print sequences.

Depending upon an application program or specific emulation program (page descriptive language analysis program) of a host computer, a paper ejection command among printer control commands is not supplied from the host computer and the printed sheet is left in the printer even after the print process is completed. A printed sheet may also be left in the printer when the print process is suspended because of some trouble of the host computer.

In a process of printing information supplied from a non-PC apparatus such as a digital camera, an Internet television and a television game machine, since the non-PC apparatus has no means for editing image data and the format of each print data is different, each print data is printed independently on a different recording sheet.

FIGS. 9A to 9C are schematic diagrams illustrating a continuous print state when there is a remaining sheet in a conventional print control apparatus.

FIG. 9A illustrates print data, e.g., text data of a page unit first received, FIG. 9B illustrates print data, e.g., graphics data, and FIG. 9C illustrates a print output obtained by receiving print data from an unrepresented first interface, printing it out, stopping printing without receiving a paper ejection command, immediately thereafter receiving print data from an unrepresented second interface and resuming printing.

With a printer having such a paper ejection control, for example, after the print data shown in FIG. 9A is printed out and the printed sheet remains in the printer, if the next print data shown in FIG. 9B is received from another interface, both the print data shown in FIGS. 9A and 9B and received from different interfaces are printed out on the same sheet.

Further, if any trouble occurs while print data supplied from a host computer via a first interface is printed and if data is received from another host computer via a second interface while the printed sheet remains in the printer, both the print data are printed out on the same sheet.

Still further, as described above, according to the related art, in order to print a plurality of files such as shown in FIGS. 10A to 10C on a single sheet such as shown in FIG. 10D, it is necessary to print the files after editing them by application software.

Furthermore, in order to print a mixed document such as shown in FIG. 11D having image data such as a photograph and text data, application software for desk-top publishing is usually required.

If image data is to be written in a document by using application software such as "Photoshop", the text data is also required to have the information amount generally same as the image data so that the size of each file becomes large.

After a photograph such as shown in FIG. 11A is directly printed from a digital camera, the printed sheet is again placed on a paper feed cassette and print data such as shown in FIG. 11B is printed in a superposed manner to obtain the print result shown in FIG. 11D. In this case, the print start position of the print data shown in FIG. 11B is required to be shifted.

SUMMARY OF THE INVENTION

The present invention has been made in order to solve the above-described problems. It is an object of the present invention to provide a print control apparatus, a print control method, and a storage medium storing programs readable by a computer, wherein a print environment either a mixed print process or an independent print process can be easily configured in accordance with a print mode intended by a user, the mixed print process printing sequentially received print data on the same recording medium with a printer engine without ejecting the recording medium, and the independent print process printing sequentially received print data on different recording media by reliably ejecting each recording medium.

According to a first aspect of the present invention, a print control apparatus is provided which comprises: a plurality of interface means for receiving print information from information processing apparatuses via a predetermined communications medium; detecting means for detecting, after first print information received by one interface means is printed on a fed first recording medium with a printer engine, whether the first recording medium has been ejected; first setting means for setting a first print mode for ejecting the first recording medium and printing second print information on a fed second recording medium, if the detecting means detects that the first recording medium remains in the printer engine at the time when the second print information is received by another interface means; and control means for controlling to execute either a mixed print process or an independent print process in accordance with the set state of the first print mode set by the first setting means, the mixed print process printing the second print information received by the other interface means on the fed first recording medium, and the independent print process printing the second print information on the second recording medium to be fed after the first recording medium is ejected.

According to a second aspect of the present invention, the control means controls the printer engine so as to execute the mixed print process of printing the second print information received by the other interface means on the fed first recording medium, if the first setting means does not set the first print mode.

According to a third aspect of the invention, a print control apparatus is provided which comprises: a plurality of interface means for receiving print information from information processing apparatuses via a predetermined communications medium; detecting means for detecting, after first print information received by one interface means is printed on a fed first recording medium with a printer engine, whether the first recording medium has been ejected; second setting means for setting a second print mode for ejecting the first recording medium and printing second print information on a fed second recording medium, if the detecting means detects that the first recording medium remains in the printer engine at the time when the second print information is received by the same interface means after a predetermined time lapse after the first print information is printed; and control means for controlling to execute either a mixed print process or an independent print process in accordance with the set state of the second print mode set by the second setting means, the mixed print process printing the second print information received by another interface means on the fed first recording medium, and the independent print process printing the second print information on the second recording medium to be fed after the first recording medium is ejected.

According to a fourth aspect of the present invention, the control means controls the printer engine so as to execute the mixed print process of printing the second print information received by the other interface means on the fed first recording medium, if the second setting means does not set the second print mode.

According to a fifth aspect of the present invention, a print control apparatus is provided which comprises: a plurality of interface means for receiving print information from information processing apparatuses via a predetermined communications medium; detecting means for detecting, after first print information received by one interface means is printed on a fed first recording medium with a printer engine, whether the first recording medium has been ejected; third setting means for setting a third print mode for ejecting the first recording medium and printing second print information on a fed second recording medium, if the detecting means detects that the first recording medium remains in the printer engine at the time when the second print information is received by another interface means after a predetermined time lapse after the first print information is printed; and control means for controlling to execute either a mixed print process or an independent print process in accordance with the set state of the third print mode set by the third setting means, the mixed print process printing the second print information received by the other interface means on the fed first recording medium, and the independent print process printing the second print information on the second recording medium to be fed after the first recording medium is ejected.

According to a sixth aspect of the present invention, the control means controls the printer engine so as to execute the mixed print process of printing the second print information received by the other interface means on the fed first recording medium, if the third setting means does not set the third print mode.

According to a seventh aspect of the present invention, a print control method of controlling a printer engine in accordance with print information received by a plurality of interface means from information processing apparatuses via a predetermined communications medium, is provided which comprises: after first print information received by one interface means is printed on a fed first recording medium with the printer engine, a detecting step of detecting whether the first recording medium has been ejected; a checking step of checking a set state of a first print mode for ejecting the first recording medium and printing second print information on a fed second recording medium, if the detecting step detects that the first recording medium remains in the printer engine at the time when the second print information is received by another interface means; a first print step of executing a mixed print process in accordance with the checked set state of the first print mode, the mixed print process printing the second print information received by the other interface means on the fed first recording medium; and a second print step of executing an independent print process in accordance with the checked set state of the first print mode, the independent print process printing the second print information on the second recording medium to be fed after the first recording medium is ejected.

According to an eighth aspect of the present invention, a storage medium storing a program readable by a computer which controls a printer engine in accordance with print information received by a plurality of interface means from information processing apparatuses via a predetermined communications medium, is provided in which the program comprises: after first print information received by one interface means is printed on a fed first recording medium with the printer engine, a detecting step of detecting whether the first recording medium has been ejected; a checking step of checking a set state of a first print mode for ejecting the first recording medium and printing second print information on a fed second recording medium, if the detecting step detects that the first recording medium remains in the printer engine at the time when the second print information is received by another interface means; a first print step of executing a mixed print process in accordance with the checked set state of the first print mode, the mixed print process printing the second print information received by the other interface means on the fed first recording medium; and a second print step of executing an independent print process in accordance with the checked set state of the first print mode, the independent print process printing the second print information on the second recording medium to be fed after the first recording medium is ejected.

According to a ninth aspect of the present invention, a print control method of controlling a printer engine in accordance with print information received by a plurality of interface means from information processing apparatuses via a predetermined communications medium, is provided which comprises: after first print information received by one interface means is printed on a fed first recording medium with the printer engine, a detecting step of detecting whether the first recording medium has been ejected; a checking step of checking a set state of a second print mode for ejecting the first recording medium and printing second print information on a fed second recording medium, if the detecting step detects that the first recording medium remains in the printer engine at the time when the second print information is received by the same interface means after a predetermined time lapse after the first print information is printed; a first print step of executing a mixed print process in accordance with the checked set state of the second print mode, the mixed print process printing the second print information received by the other interface means on the fed first recording medium; and a second print step of executing an independent print process in accordance with the checked set state of the second print mode, the independent print process printing the second print information on the second recording medium to be fed after the first recording medium is ejected.

According to a tenth aspect of the present invention, a storage medium storing a program readable by a computer which controls a printer engine in accordance with print information received by a plurality of interface means from information processing apparatuses via a predetermined communications medium, is provided in which the program comprises: after first print information received by one interface means is printed on a fed first recording medium with the printer engine, a detecting step of detecting whether the first recording medium has been ejected; a checking step of checking a set state of a second print mode for ejecting the first recording medium and printing second print information on a fed second recording medium, if the detecting step detects that the first recording medium remains in the printer engine at the time when the second print information is received by the same interface means after a predetermined time lapse after the first print information is printed; a first print step of executing a mixed print process in accordance with the checked set state of the second print mode, the mixed print process printing the second print information received by the other interface means on the fed first recording medium; and a second print step of executing an independent print process in accordance with the checked set state of the second print mode, the independent print process printing the second print information on the second recording medium to be fed after the first recording medium is ejected.

According to an eleventh aspect of the present invention, a print control method of controlling a printer engine in accordance with print information received by a plurality of interface means from information processing apparatuses via a predetermined communications medium, is provided which comprises: after first print information received by one interface means is printed on a fed first recording medium with the printer engine, a detecting step of detecting whether the first recording medium has been ejected; a checking step of checking a set state of a second print mode for ejecting the first recording medium and printing second print information on a fed second recording medium, if the detecting step detects that the first recording medium remains in the printer engine at the time when the second print information is received by another interface means after a predetermined time lapse after the first print information is printed; a first print step of executing a mixed print process in accordance with the checked set state of the second print mode, the mixed print process printing the second print information received by the other interface means on the fed first recording medium; and a second print step of executing an independent print process in accordance with the checked set state of the second print mode, the independent print process printing the second print information received by the other interface means on the second recording medium to be fed after the first recording medium is ejected.

According to a twelfth aspect of the present invention, a storage medium storing a program readable by a computer which controls a printer engine in accordance with print information received by a plurality of interface means from information processing apparatuses via a predetermined communications medium, is provided in which the program comprises: after first print information received by one interface means is printed on a fed first recording medium with the printer engine, a detecting step of detecting whether the first recording medium has been ejected; a checking step of checking a set state of a second print mode for ejecting the first recording medium and printing second print information on a fed second recording medium, if the detecting step detects that the first recording medium remains in the printer engine at the time when the second print information is received by another interface means after a predetermined time lapse after the first print information is printed; a first print step of executing a mixed print process in accordance with the checked set state of the second print mode, the mixed print process printing the second print information received by the other interface means on the fed first recording medium; and a second print step of executing an independent print process in accordance with the checked set state of the second print mode, the independent print process printing the second print information received by the other interface means on the second recording medium to be fed after the first recording medium is ejected.

According to a thirteenth aspect of the present invention, a print control apparatus is provided which comprises: interface means for receiving data from an external apparatus; analyzing means for analyzing the data received by the interface means; print means for printing bit map data on a recording medium in accordance with analyzed results of the analyzing means; and setting means for setting a first mode of discarding a paper ejection command if the analyzed results of the analyzing means indicate the paper ejection command.

According to a fourteenth aspect of the present invention, the print control apparatus further comprises detecting means for detecting whether the recording medium remains on a transport unit of the print means, wherein when data is received by the interface means in the first mode set by the setting means, the data is printed on the recording medium with the print means if the detecting means detects that the recording medium remains, whereas the data is printed on a next fed recording medium if the detecting means detects that the recording medium does not remain.

According to a fifteenth aspect of the present invention, a plurality of interface means are provided and exchanged upon reception of data.

According to a sixteenth aspect of the present invention, the setting means sets a second mode of ejecting the recording medium in accordance with a paper ejection command if the analyzed results of the analyzing means indicate the paper ejection command.

According to a seventeenth aspect of the present invention, when data is received by the interface means in the second mode set by the setting means, the data is printed on a next recording medium with the print means by ejecting the recording medium if the detecting means detects that the recording medium remains.

According to an eighteenth aspect of the present invention, the print control apparatus further comprises paper ejection instructing means for instructing to eject the recording paper out of a transport unit of the print means, wherein in the first mode, the recording medium is ejected if a paper ejection is instructed by the paper ejection instructing means or if a print area of the recording medium becomes insufficient.

According to a nineteenth aspect of the present invention, the external apparatus is a host computer.

According to a twentieth aspect of the present invention, the external apparatus is a digital camera.

According to a twenty-first aspect of the present invention, a print control method of controlling a print control apparatus having interface means for receiving data from an external apparatus, is provided which comprises: an analyzing step of analyzing the data received by the interface means; a print step of printing bit map data on a recording medium in accordance with analyzed results of the analyzing step; and a setting step of setting a first mode of discarding a paper ejection command if the analyzed results at the analyzing step indicate the paper ejection command.

According to a twenty-second aspect of the present invention, the print control method further comprises a detecting step of detecting whether the recording medium remains on a transport unit of a printer engine, wherein when data is received by the interface means in the first mode set at the setting step, the data is printed on the recording medium with the printer engine if the detecting step detects that the recording medium remains, whereas the data is printed on a next fed recording medium if the detecting step detects that the recording medium does not remain.

According to a twenty-third aspect of the present invention, a plurality of interface means are provided and exchanged upon reception of data.

According to a twenty-fourth aspect of the present invention, the setting step sets a second mode of ejecting the recording medium in accordance with a paper ejection command if the analyzed results at the analyzing step indicate the paper ejection command.

According to a twenty-fifth aspect of the present invention, when data is received by the interface means in the second mode set at the setting step, the data is printed on a next recording medium with the printer engine by ejecting the recording medium if the detecting step detects that the recording medium remains.

According to a twenty-sixth aspect of the present invention, the print control method further comprises a paper ejection instructing step of instructing to eject the recording paper out of a transport unit of the printer engine, wherein in the first mode, the recording medium is ejected if a paper ejection is instructed at the paper ejection instructing step or if a print area of the recording medium becomes insufficient.

According to a twenty-seventh aspect of the present invention, the external apparatus is a host computer.

According to a twenty-eighth aspect of the present invention, the external apparatus is a digital camera.

According to a twenty-ninth aspect of the present invention, a storage medium storing a computer readable control program for controlling a print control apparatus having interface means for receiving data from an external apparatus, is provided in which the control program comprises: an analyzing step of analyzing the data received by the interface means; a print step of printing bit map data on a recording medium in accordance with analyzed results of the analyzing step; and a setting step of setting a first mode of discarding a paper ejection command if the analyzed results at the analyzing step indicate the paper ejection command.

According to a thirtieth aspect of the present invention, the control program further comprises a detecting step of detecting whether the recording medium remains on a transport unit of a printer engine, and when data is received by the interface means in the first mode set at the setting step, the data is printed on the recording medium with the printer engine if the detecting step detects that the recording medium remains, whereas the data is printed on a next fed recording medium if the detecting step detects that the recording medium does not remain.

According to a thirty-first aspect of the present invention, a plurality of interface means are provided and exchanged upon reception of data.

According to a thirty-second aspect of the present invention, the setting step sets a second mode of ejecting the recording medium in accordance with a paper ejection command if the analyzed results at the analyzing step indicate the paper ejection command.

According to a thirty-third aspect of the present invention, when data is received by the interface means in the second mode set at the setting step, the data is printed on a next recording medium with the printer engine by ejecting the recording medium if the detecting step detects that the recording medium remains.

According to a thirty-fourth aspect of the present invention, the control program further comprises a paper ejection instructing step of instructing to eject the recording paper out of a transport unit of the printer engine, wherein in the first mode, the recording medium is ejected if a paper ejection is instructed at the paper ejection instructing step or if a print area of the recording medium becomes insufficient.

BRIEF DESCRIPTION OF THE DRAWINGS

FIG. 7 is a flow chart illustrating an example of a third print control procedure of a print control apparatus according to the second embodiment of the invention.

FIG. 8 is a memory map of a storage medium storing various data processing programs, the storage medium being readable by the print control apparatus of the invention.

FIG. 15 is a diagram showing a correspondence between print data and a process of the print control apparatus according to the fourth embodiment of the invention.

DETAILED DESCRIPTION OF THE PREFERRED EMBODIMENTS

First Embodiment

Figure 1:
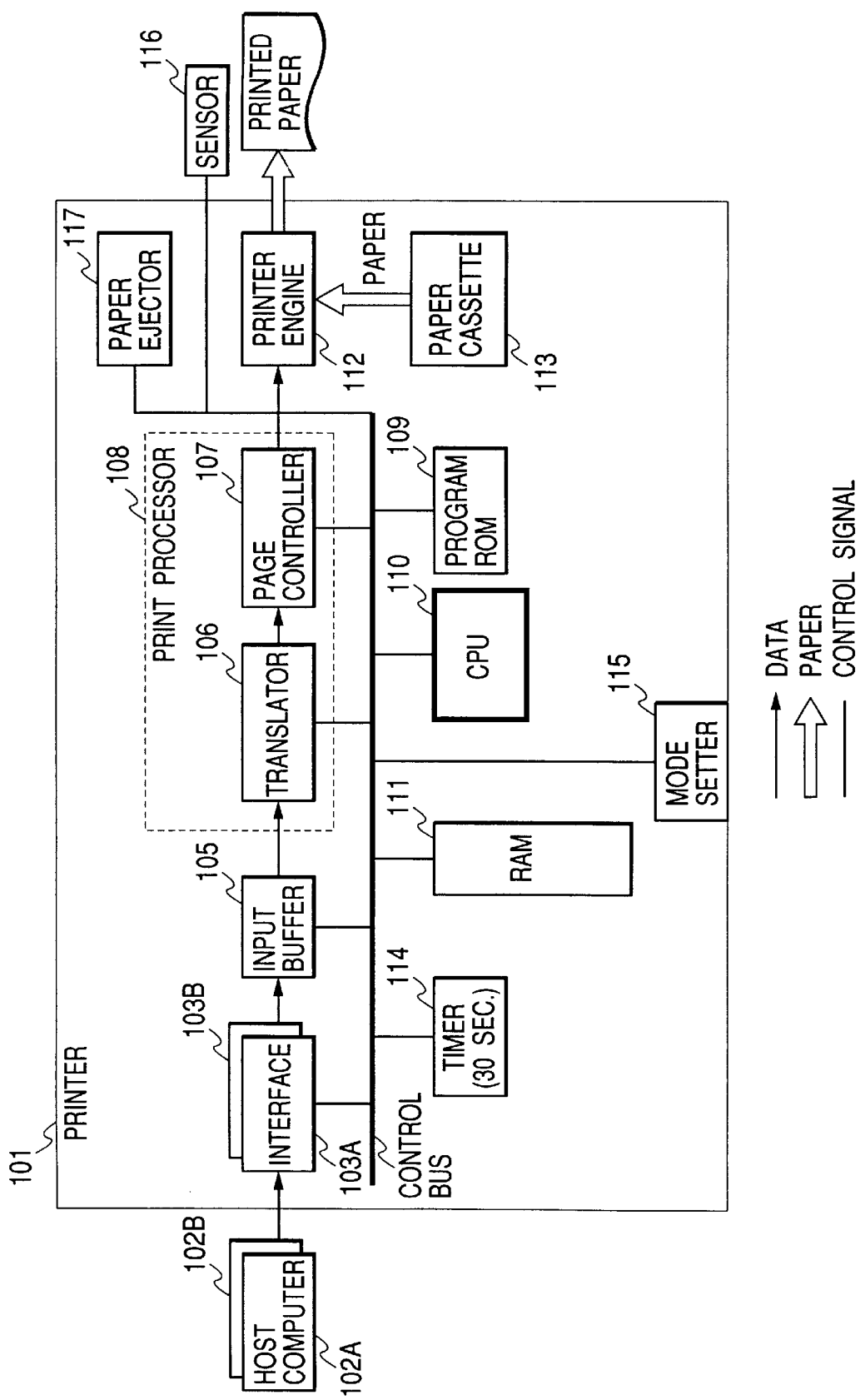
FIG. 1 is a block diagram showing the structure of a print control apparatus according to a first embodiment of the invention.

FIG. 1 is a block diagram showing the structure of a print control apparatus according to the first embodiment of the invention. This print control apparatus has a plurality of interfaces 103A and 103B for the communications with a plurality of host computers 102A and 102B. The interfaces of the print control apparatus can be exchanged manually or automatically when data is received.

Referring to FIG. 1, reference numeral 101 represents the print control apparatus, and reference numerals 102A and 102B represent the host computers (hosts) which supply print data to the print control apparatus 101. Reference numerals 103A and 103B represent the interfaces (data input means) for receiving print data supplied from the hosts 102A and 102B. Each interface is, for example, IEEE 1394 described in Japanese Patent Application No. 9-30541.

Reference numeral 105 represents an input buffer for temporarily storing print data received by the interfaces 103A and 103B or data input means. Reference numeral 106 represents a translator for picking up print data from the input buffer 105 and analyzing the print data to form drawing data of each page. Reference numeral 107 represents a page controller for converting the drawing data sent from the translator 106 into a video signal and supplying it to a printer engine 112.

Reference numeral 108 represents a print processor which is constituted of, in this embodiment, the translator 106 and page controller 107. Reference numeral 109 represents a program ROM which stores control programs of the print control apparatus 101. Reference numeral 110 represents a central processing unit (CPU) which reads programs from the program ROM 109 to control the print control apparatus 101. Reference numeral 111 represents a random access memory (RAM) used during program running. This RAM 111 has a reserved memory area for storing drawing data of a plurality of pages (in this embodiment, two pages) generated by the translator 106, this memory area being called a RAM reserved area.

The printer engine 112 transfers and outputs an image of a video signal sent from the page controller 107 onto a recording sheet. Reference numeral 113 represents a paper cassette for accommodating recording sheets. Reference numeral 114 represents a timer which measures a time (30 seconds) taken to receive the next data after the interface 103A, 103B receives data from the hosts 102A, 102B.

Reference numeral 115 represents a mode setter for setting a first or second paper ejection mode (paper ejection mode 1 or 2 in the drawings). When the first paper ejection mode is set, if a sensor 116 detects a recording sheet remained in the printer engine 112 when data is received from one interface after data from the other interface was printed out, then a new recording sheet is supplied to start printing after the printed sheet is ejected. When the second paper ejection mode is set, if the sensor 116 detects a recording sheet remained in the printer engine 112 when data is received from one interface after a predetermined time (measured with the timer 114) after data from the same interface was printed out, then a new recording sheet is supplied to start printing after the printed sheet is ejected. In accordance with the type of the set paper ejection mode, CPU 110 controls the print process of the printer engine 112.

The sensor 116 detects whether a recording sheet remains in a paper transport unit of the print control apparatus. Since this sensor 116 can detect whether a recording sheet remains in a print designated area, it is possible not to print data on an area where there is no recording sheet. In this invention, by utilizing the detection results by the sensor 116, the process of printing the next print data is controlled. The details thereof will be later given.

Reference numeral 117 represents a paper ejector (also called paper transport means) for ejecting a recording sheet present in a transport unit when a paper ejection command is input from the host computer or when a paper ejection instruction is received from the mode setter 115. In a serial printer as one example of the print control apparatus of this invention, the paper ejector 117 serving as paper transport means transports a recording sheet in a direction perpendicular to a scan direction of a print head while the print head is reciprocally scanned during printing.

Figure 2:
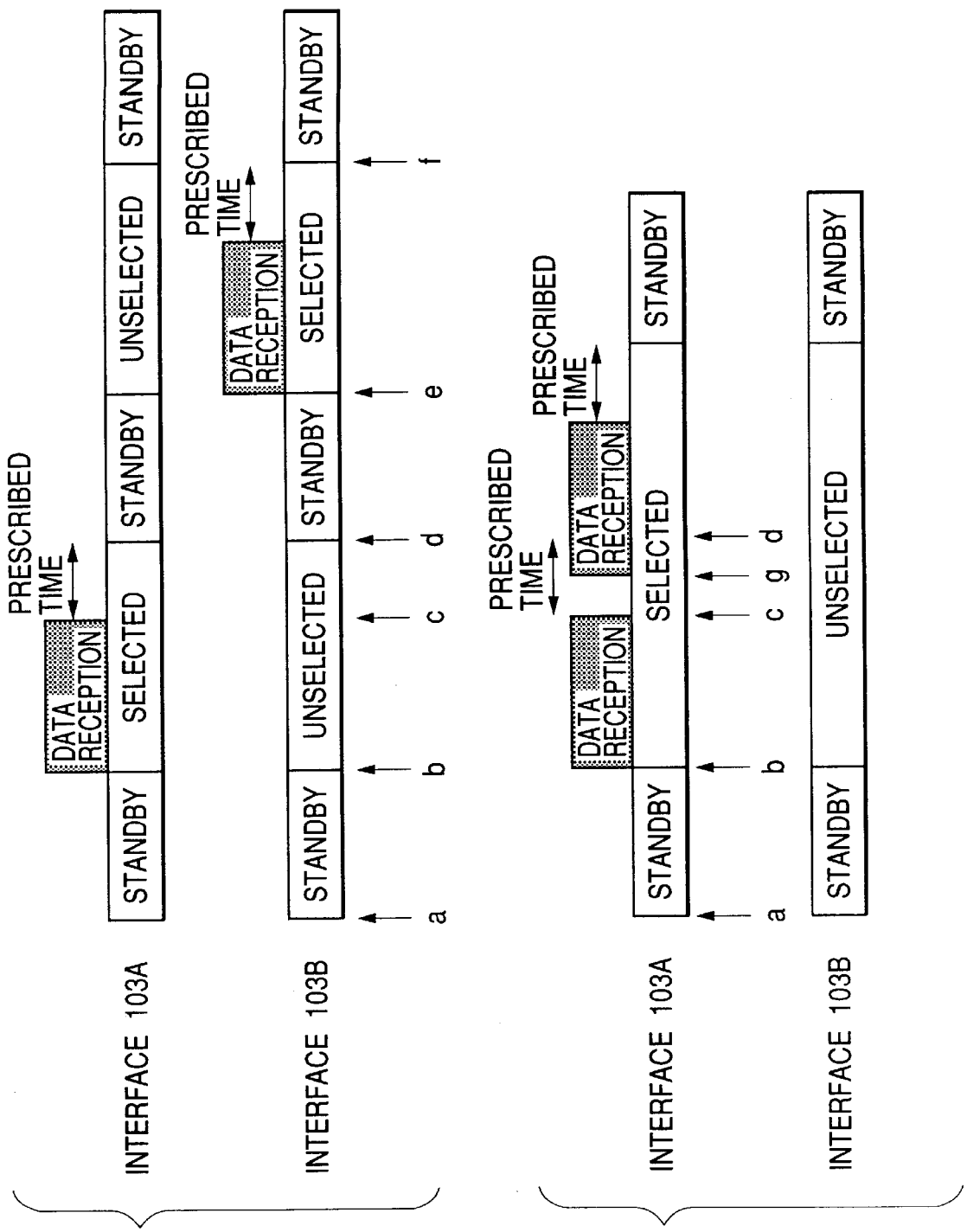
FIGS. 2A and 2B are diagrams illustrating an interface exchange process to be executed by the print control apparatus shown in FIG. 1.

FIGS. 2A and 2B are diagrams illustrating an interface exchange process to be executed by the print control apparatus shown in FIG. 1.

Referring to FIG. 2A, both the interfaces 103A and 103B are in a standby state at time a, and can receive data from either from the host 102A or 102B. When data arrives at time b, the interface 103A receives it.

In this case, the interface 103B is in an unselected state. Although the data reception by the interface 103A is completed at time c, the interface 103B holds this unselected state until a predetermined time lapses.

If there is no data transmission until time d, both the interfaces 103A and 103B enter again the standby state at time d, similar at time a. When data arrives at time e, the interface 103B receives it, similar at time b.

Referring to FIG. 2B, if data transmission starts at time g before a predetermined time does not lapse after data transmission by the interface 103A was completed, the selected state of the interface 103A continues to receive the next data. In this case, the interface 103B maintains the unselected state.

The characteristic structure of this embodiment will be described in the following.

The print control apparatus constructed as above comprises: a plurality of interface means (interfaces 103A and 103B) for receiving print information from information processing apparatuses via a predetermined communications medium; detecting means (sensor 116) for detecting, after first print information received by one interface means is printed on a fed first recording medium with a printer engine (112) whether the first recording medium has been ejected; first setting means (setting with the mode setter 115 or with a command from the host computer 102A, 102B) for setting a first print mode for ejecting the first recording medium and printing second print information on a fed second recording medium, if the detecting means detects that the first recording medium remains in the printer engine at the time when the second print information is received by another interface means; and control means (CPU 110 executing a control program stored in the program ROM 109) for controlling to execute either a mixed print process or an independent print process in accordance with the set state of the first print mode set by the first setting means, the mixed print process printing the second print information received by the other interface means on the fed first recording medium, and the independent print process printing the second print information on the second recording medium to be fed after the first recording medium is ejected. Accordingly, the first print information received via one interface means and the second print information received via another interface means after the first print information is printed can be mixedly or independently printed in accordance with a print mode set by a user. A print environment can therefore be configured with ease.

The print control apparatus constructed as above comprises: a plurality of interface means (interfaces 103A and 103B) for receiving print information from information processing apparatuses via a predetermined communications medium; detecting means (sensor 116) for detecting, after first print information received by one interface means is printed on a fed first recording medium with a printer engine (112), whether the first recording medium has been ejected; second setting means (setting with the mode setter 115 or a command from the host computer 102A, 102B) for setting a second print mode for ejecting the first recording medium and printing second print information on a fed second recording medium, if the detecting means detects that the first recording medium remains in the printer engine at the time when the second print information is received by the same interface means after a predetermined time lapse after the first print information is printed; and control means (CPU 110 executing a control program stored in the program ROM 109) for controlling to execute either a mixed print process or an independent print process in accordance with the set state of the second print mode set by the second setting means, the mixed print process printing the second print information received by another interface means on the fed first recording medium, and the independent print process printing the second print information on the second recording medium to be fed after the first recording medium is ejected. Accordingly, the first print information received via one interface means and the second print information received via the same interface means after the predetermined time lapse after the first print information is printed can be mixedly or independently printed in accordance with a print mode set by a user. A print environment can therefore be configured with ease.

The print control apparatus constructed as above comprises: a plurality of interface means (interfaces 103A and 103B) for receiving print information from information processing apparatuses via a predetermined communications medium; detecting means (sensor 116) for detecting, after first print information received by one interface means is printed on a fed first recording medium with a printer engine (112), whether the first recording medium has been ejected; third setting means (setting with the mode setter 115 or a command from the host computer 102A, 102B) for setting a third print mode for ejecting the first recording medium and printing second print in formation on a fed second recording medium, if the detecting means detects that the first recording medium remains in the printer engine at the time when the second print information is received by another interface means after a predetermined time lapse after the first print information is printed; and control means (CPU 110 executing a control program stored in the program ROM 109) for controlling to execute either a mixed print process or an independent print process in accordance with the set state of the third print mode set by the third setting means, the mixed print process printing the second print information received by the other interface means on the fed first recording medium, and the independent print process printing the second print information on the second recording medium to be fed after the first recording medium is ejected. Accordingly, the first print information received via one interface means and the second print information received via another interface means after the predetermined time lapse after the first print information is printed can be mixedly or independently printed in accordance with a print mode set by a user. A print environment can therefore be configured with ease.

With reference to the flow chart shown in FIG. 3, the print control operation of the print control apparatus of this invention will be described.

Figure 3:
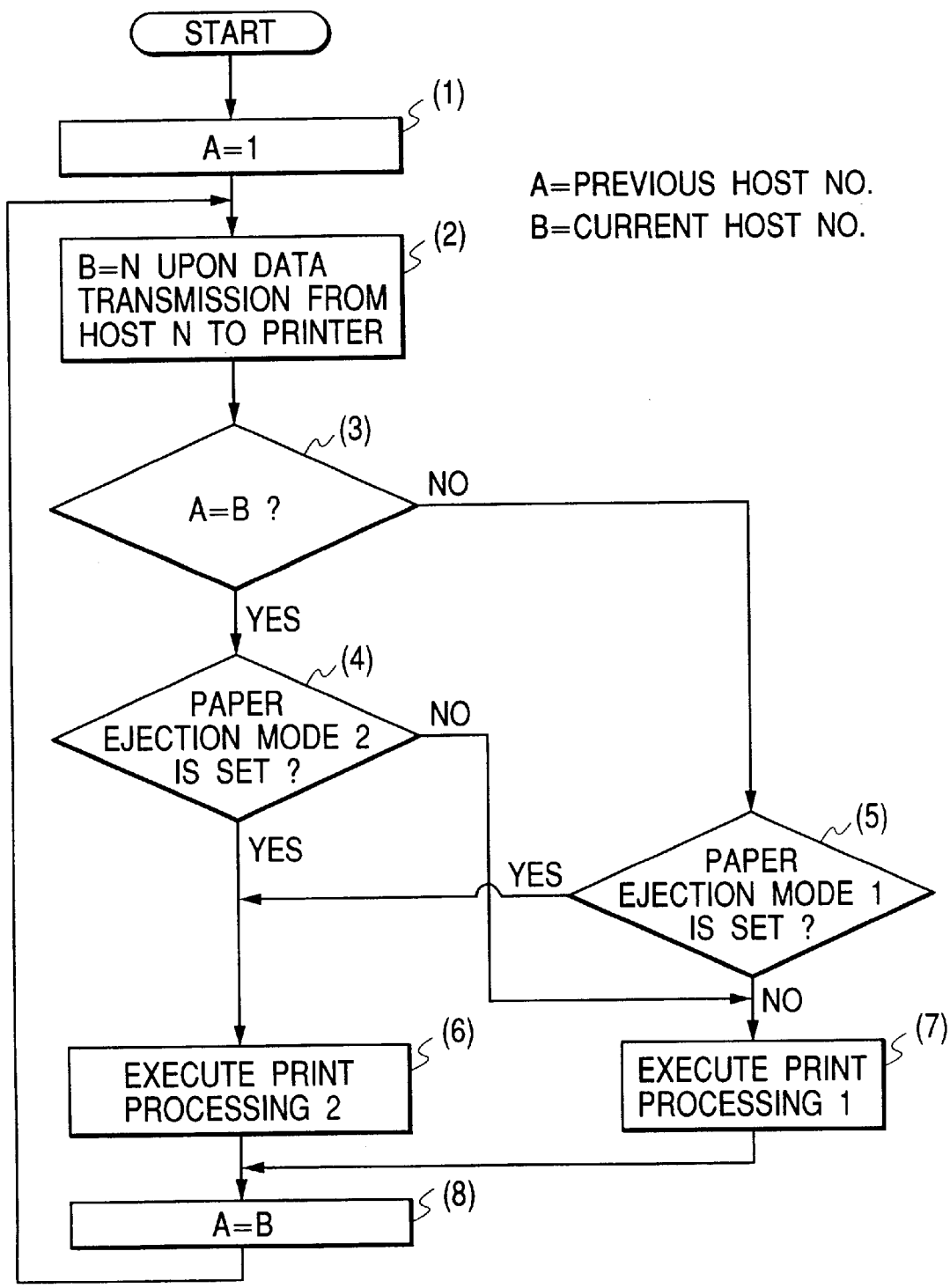
FIG. 3 is a flow chart illustrating an example of a print control procedure of the print control apparatus of the invention.

FIG. 3 is a flow chart illustrating an example of the print control procedure of this invention. (1) to (8) are steps of the procedure.

First, the previous host number is initialized to "1" (Step 1). Next, the current host number B is set to "N" upon data transmission from a host N to the printer (Step 2). It is checked whether the interface is the same as that of the previous data reception, i.e., whether the host number A is the same as B (Step 3). In the case of a first data reception, it is checked whether the interface is the same as the initialized interface.

If NO at Step 3, the flow advances to Step 5, whereas if YES, i.e., if data reception is performed by the interface same as that of the previous data reception, it is checked whether the second paper ejection mode is set (Step 4). If YES, a second print routine to be described later is performed (Step 6), and the previous host number A is updated to the current host number B (Step 8) to return to Step 2.

If it is judged at Step 4 that the second paper ejection mode is not set, a first print routine of continuing to print is executed (Step 7) to follow Step 8.

If NO at Step 3, it is checked whether the first paper ejection mode is set (Step 5). If YES, the flow advances to Step 6, whereas if NO, the flow advances to Step 7.

Figure 4:
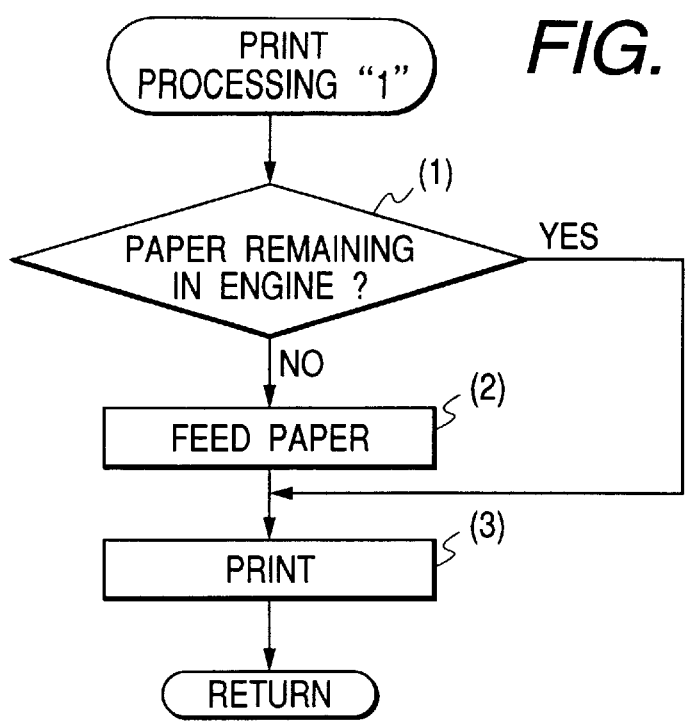
FIG. 4 is a flow chart illustrating the details of a first print routine shown in FIG. 3.

FIG. 4 is a flow chart illustrating an example of the details of the first print routine shown in FIG. 3. (1) to (3) are steps of the first print routine.

First, it is checked at Step 1 whether the sensor 116 detects a presence of a recording sheet. If NO, a recording sheet is fed (Step 3) and data is printed with the printer engine 112 (Step 4) to return to the main routine.

Figure 5:
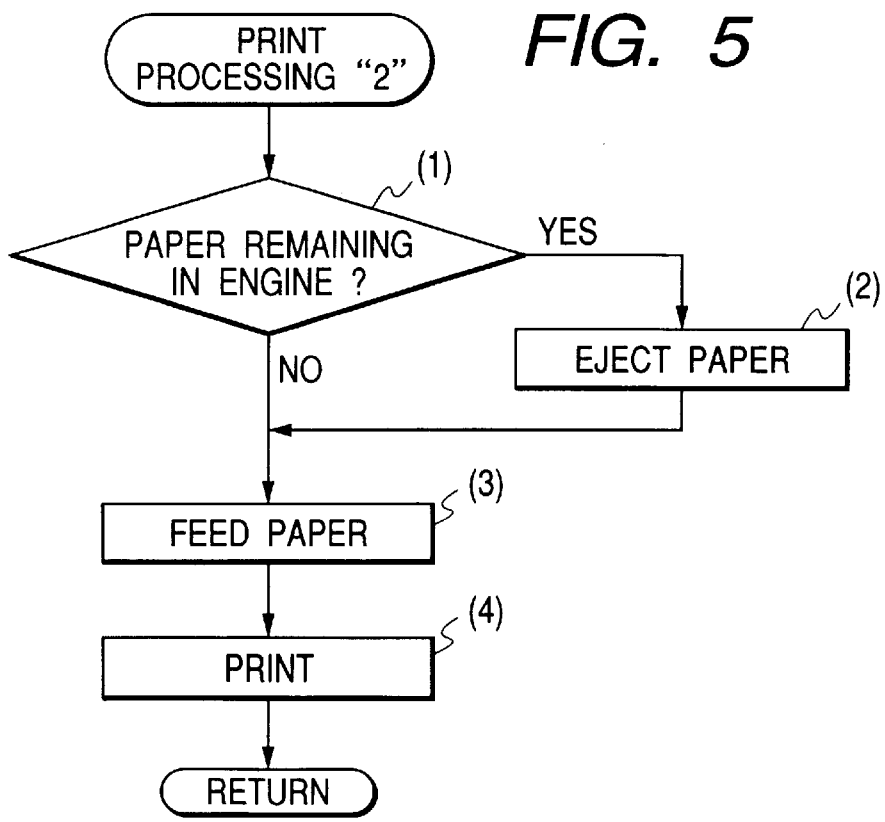
FIG. 5 is a flow chart illustrating the details of a second print routine shown in FIG. 3.

FIG. 5 is a flow chart illustrating an example of the details of the second print routine shown in FIG. 3. (1) to (4) are steps of the second print routine.

First, it is checked at Step 1 whether the sensor 116 detects a presence of a recording sheet. If NO, a recording sheet is fed (Step 3) and data is printed with the printer engine 112 (Step 3) to return to the main routine.

If it is judged at Step 1 that the sensor 116 detects a presence of a recording sheet, this sheet is ejected by a paper ejector 117 (Step 2) to follow Step 3 whereat a new recording sheet is fed, and data is printed on the new recording sheet with the printer engine 112 to return to the main routine.

In this manner, when the first paper ejection mode is set and the second paper ejection mode is set (I) if there is a recording sheet remaining in the printer upon reception of print data from a different interface, the received print data is printed on a new recording sheet after the remaining recording sheet is ejected, or (II) if there is a recording sheet remaining in the printer upon reception of print data from the same interface, the received print data is printed on a new recording sheet after the remaining recording sheet is ejected.

When the first paper ejection mode is set and the second paper ejection mode is not set, (I) if there is a recording sheet remaining in the printer upon reception of print data from a different interface, the received print data is printed on a new recording sheet after the remaining recording sheet is ejected, or if there is a recording sheet remaining in the printer upon reception of (II) print data from the same interface, the received print data is printed on the same, remaining recording sheet.

When the first paper ejection mode is not set and the second paper ejection mode is set, (I) if there is a recording sheet remaining in the printer upon reception of print data from a different interface, the received print data is printed on the same, remaining recording sheet, or (II) if there is a recording sheet remaining in the printer upon reception of print data from the same interface, the received print data is printed on a new recording sheet after the remaining recording sheet is ejected.

When the first paper ejection mode is not set and the second paper ejection mode is not set, (I) if there is a recording sheet remaining in the printer, upon reception of print data from a different interface, the received print data is printed on the same, remaining recording sheet, or (II) if there is a recording sheet remaining in the printer upon reception of print data from the same interface, the received print data is printed on the same, remaining recording sheet.

With reference to FIGS. 3 to 5 and other necessary drawings, the print control method characteristic of this embodiment will be described.

The print control method of controlling a printer engine in accordance with print information received by a plurality of interface means from information processing apparatuses via a predetermined communications medium, comprises: after first print information received by one interface means (interfaces 103A, 103B) is printed on a fed first recording medium with the printer engine (112), a detecting step (Step 1 in FIGS. 4 and 5) of detecting whether the first recording medium has been ejected; a checking step (Steps 4 and 6 in FIG. 3) of checking a set state of a first print mode for ejecting the first recording medium and printing second print information on a fed second recording medium, if the detecting step detects that the first recording medium remains in the printer engine at the time when the second print information is received by another interface means; a first print step (Step 7 in FIG. 3) of executing a mixed print process in accordance with the checked set state of the first print mode, the mixed print process printing the second print information received by the other interface means on the fed first recording medium; and a second print step (Step 8 in FIG. 3) of executing an independent print process in accordance with the checked set state of the first print mode, the independent print process printing the second print information on the second recording medium to be fed after the first recording medium is ejected. Each step is stored in the program ROM 109 and executed by CPU 110. Accordingly, the first print information received via one interface means and the second print information received via another interface means after the first print information is printed can be mixedly or independently printed in accordance with a print mode set by a user. A print environment can therefore be configured with ease.

Various storage media to be described later, the media storing the steps of the above method, are intended to be included in this embodiment.

Second Embodiment

Figure 6:
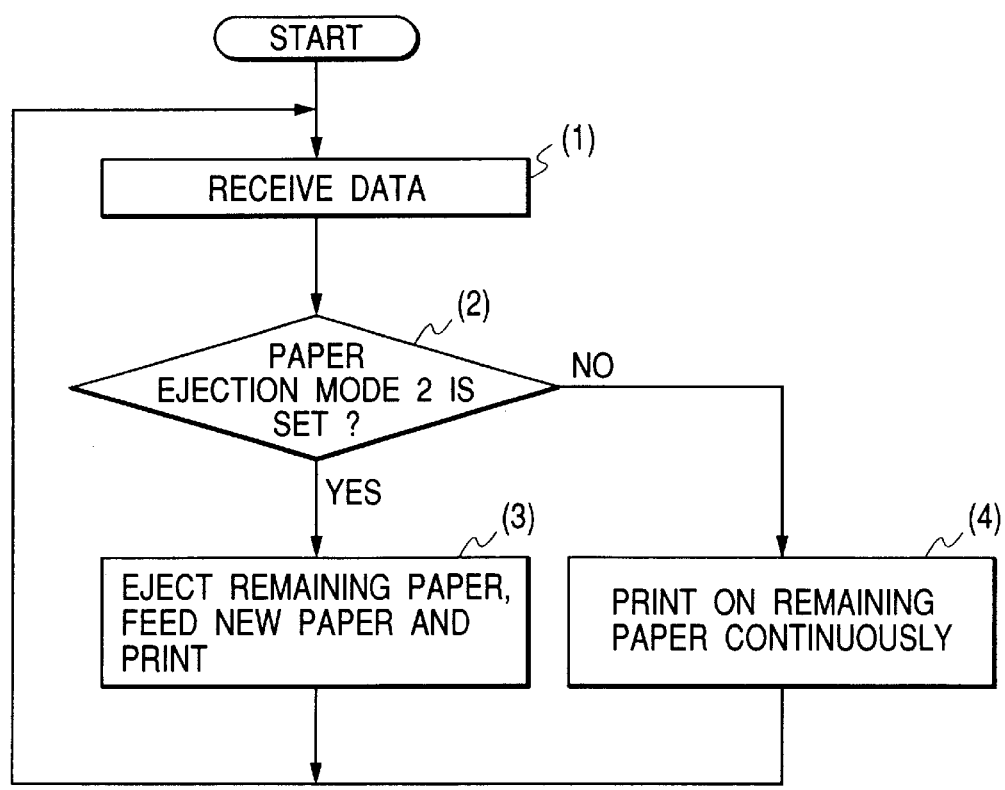
FIG. 6 is a flow chart illustrating an example of a second print control procedure of a print control apparatus according to a second embodiment of the invention.
Figure 9A:
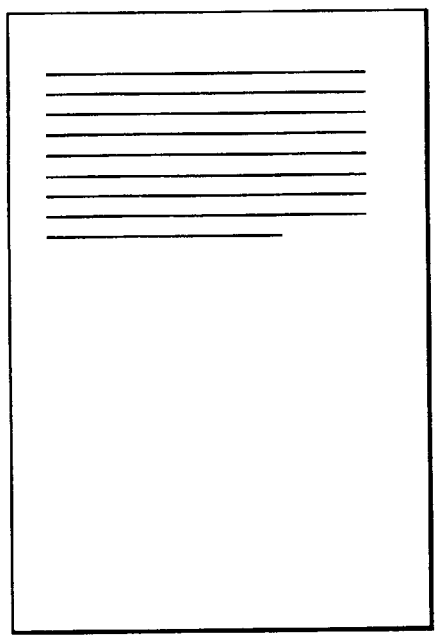
FIGS. 9A, 9B and 9C are schematic diagrams illustrating a continuous print state while a recording sheet remains in a conventional print apparatus.
Figure 9B:
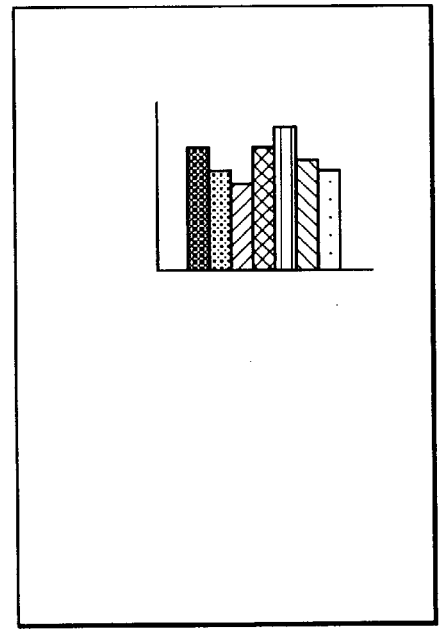
Figure 9C:
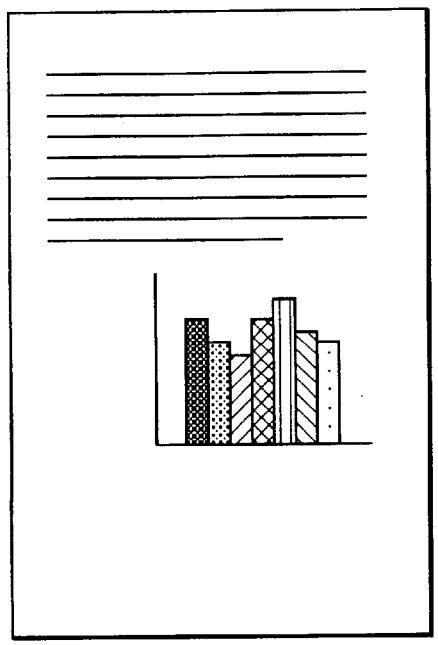

FIG. 6 is a flow chart illustrating an example of a second print control procedure of a print control apparatus according to the second embodiment of the invention. (1) to (4) are steps of the second print control procedure.

First, when one of the interfaces 103A and 103B in the standby state receives print data from one of the host computers 102A and 102B (Step 1), it is checked at Step 2 whether the second paper ejection mode is presently set. If YES, data is printed at Step 3 after the previous recording sheet is ejected, in accordance with the routine shown in FIG. 5, to thereafter return to Step 1.

If NO at Step 2, data is printed at Step 4 on the same recording sheet, in accordance with the routine shown in FIG. 4, to thereafter return to Step 1.

In this manner, if the second paper ejection mode is set and a recording sheet remains in the printer, data is printed on a new recording sheet after the previous recording sheet is ejected. If the second paper ejection mode is not set and a recording sheet remains in the printer, data is printed on the same recording sheet.

With reference to FIGS. 4 to 6 and other necessary drawings, the print control method characteristic of this embodiment will be described.

The print control method of controlling a printer engine in accordance with print information received by a plurality of interface means from information processing apparatuses via a predetermined communications medium, comprises: after first print information received by one interface means (interfaces 103A, 103B) is printed on a fed first recording medium with the printer engine (112), a detecting step (Step 1 in FIGS. 4 and 5) of detecting whether the first recording medium has been ejected; a checking step (Steps 1 and 2 in FIG. 6) of checking a set state of a second print mode for ejecting the first recording medium and printing second print information on a fed second recording medium, if the detecting step detects that the first recording medium remains in the printer engine at the time when the second print information is received by the same interface means after a predetermined time lapse after the first print information is printed; a first print step (Step 4 in FIG. 6) of executing a mixed print process in accordance with the checked set state of the second print mode, the mixed print process printing the second print information received by the other interface means on the fed first recording medium; and a second print step (Step 3 in FIG. 6) of executing an independent print process in accordance with the checked set state of the second print mode, the independent print process printing the second print information on the second recording medium to be fed after the first recording medium is ejected. Each step is stored in the program ROM 109 and executed by CPU 110. Accordingly, the first print information received via one interface means and the second print information received via the same interface means after the predetermined time lapse after the first print information is printed can be mixedly or independently printed in accordance with a print mode set by a user. A print environment can therefore be configured with ease.

Various storage media to be described later, the media storing the steps of the above method, are intended to be included in this embodiment.

Third Embodiment

In the third embodiment of this invention, a print control procedure of a print control apparatus capable of minutely setting a paper ejection mode in accordance with each interface receiving data, will be described.

In the print control apparatus according to the third embodiment of the invention, the mode setter 115 of the print control apparatus as described with the first embodiment can set minutely one of four paper ejection modes.

With a first paper ejection mode being set, if data is received by the interface 103B after data from the interface 103A is printed and if the sensor 116 detects presence of a recording sheet remaining in the printer engine 112, then the data is printed on a new recording sheet after the remaining recording sheet is ejected.

With a second paper ejection mode being set, if data is received by the interface 103A after a predetermined time lapse after the previous data from the interface 103A is printed and if the sensor 116 detects presence of a recording sheet remaining in the printer engine 112, then the data is printed on a new recording sheet after the remaining recording sheet is ejected.

With a third paper ejection mode being set, if data is received by the interface 103A after data from the interface 103B is printed and if the sensor 116 detects presence of a recording sheet remaining in the printer engine 112, then the data is printed on a new recording sheet after the remaining recording sheet is ejected.

With a fourth paper ejection mode being set, if data is received by the interface 103B after a predetermined time lapse after previous data from the interface 103B is printed and if the sensor 116 detects presence of a recording sheet remaining in the printer engine 112, then the data is printed on a new recording sheet after the recording sheet is ejected.

FIG. 7 is a flow chart illustrating an example of the third print control procedure of a print control apparatus according to the third embodiment of the invention. (1) to (10) are steps of the third print control procedure.

First, the previous host number is initialized to "1" (Step 1). Next, the current host number B is set to "N" upon data transmission from a host N to the printer (Step 2). It is checked whether the interface is the same as that of the previous data reception, i.e., whether the host number A is the same as B (Step 3).

If the check results of the host numbers A and B at Step 3 indicate that both the host numbers A and B are the interface 103A (A=1, B=1), then it is checked whether the second paper ejection mode is set (Step 4). If YES, the second print routine shown in FIG. 5 is executed at Step 8, and the previous host number A is renewed to the current host number B at Step 10 to thereafter return to Step 2.

If NO at Step 4, the first print routine shown in FIG. 4 is executed at Step 9 to follow Step 10.

If the check results at Step 3 indicates that a relationship between the host numbers A and B is A=1 (interface 103A) and B=2 (interface 103B), then it is checked whether the first paper ejection mode is set (Step 5). If YES, the second print routine shown in FIG. 5 is executed at Step 8, and the previous host number A is renewed to the current host number B at Step 10 to thereafter return to Step 2.

If NO at Step 5, the first print routine shown in FIG. 4 is executed at Step 9 to follow Step 10.

If the check results at Step 3 indicates that a relationship between the host numbers A and B is A=2 (interface 103B) and B=1 (interface 103A), then it is checked whether the third paper ejection mode is set (Step 6). If YES, the second print routine shown in FIG. 5 is executed at Step 8, and the previous host number A is renewed to the current host number B at Step 10 to thereafter return to Step 2.

If NO at Step 6, the first print routine shown in FIG. 4 is executed at Step 9 to follow Step 10.

If the check results at Step 3 indicates that a relationship between the host numbers A and B is A=2 (interface 103B) and B=2 (interface 103B), then it is checked whether the fourth paper ejection mode is set (Step 7). If YES, the second print routine shown in FIG. 5 is executed at Step 8, and the previous host number A is renewed to the current host number B at Step 10 to thereafter return to Step 2.

If NO at Step 7, the first print routine shown in FIG. 4 is executed at Step 9 to follow Step 10.

Although the first embodiment checks only whether the host is the same host, the third embodiment can minutely determine the paper ejection mode. For example, if data from the host 1 is to be printed after data from the same host 1 is printed ("YES" at Step 4 to follow Step 8), the data is printed after the previous recording sheet is ejected, whereas if data from the host 2 is to be printed after data from the same host 2 is printed ("NO" at Step 7 to follow Step 9), the data is printed on the same recording sheet.

With reference to FIGS. 4 to 6 and other necessary drawings, the print control method characteristic of this embodiment will be described.

The print control method of controlling a printer engine in accordance with print information received by a plurality of interface means from information processing apparatuses via a predetermined communications medium, comprises: after first print information received by one interface means (interfaces 103A, 103B) is printed on a fed first recording medium with the printer engine (112), a detecting step (Step 1 in FIGS. 4 and 5) of detecting whether the first recording medium has been ejected; a checking step (Steps 4 to 7 in FIG. 7) of checking a set state of a second print mode for ejecting the first recording medium and printing second print information on a fed second recording medium, if the detecting step detects that the first recording medium remains in the printer engine at the time when the second print information is received by another interface means after a predetermined time lapse after the first print information is printed; a first print step (Step 9 in FIG. 7) of executing a mixed print process in accordance with the checked set state of the second print mode, the mixed print process printing the second print information received by the other interface means on the fed first recording medium; and a second print step (Step 8 in FIG. 7) of executing an independent print process in accordance with the checked set state of the second print mode, the independent print process printing the second print information received by the other interface means on the second recording medium to be fed after the first recording medium is ejected. Each step is stored in the program ROM 109 and executed by CPU 110. Accordingly, the first print information received via one interface means and the second print information received via another interface means after the predetermined time lapse after the first print information is printed can be mixedly or independently printed in accordance with a print mode set by a user. A print environment can therefore be configured with ease.

Various storage media to be described later, the media storing the steps of the above method, are intended to be included in this embodiment.

Fourth Embodiment

In the fourth embodiment of the invention, it is assumed that the print control apparatus shown in FIG. 1 is connected to a host computer 102A and a digital camera 102B.

Figure 12:
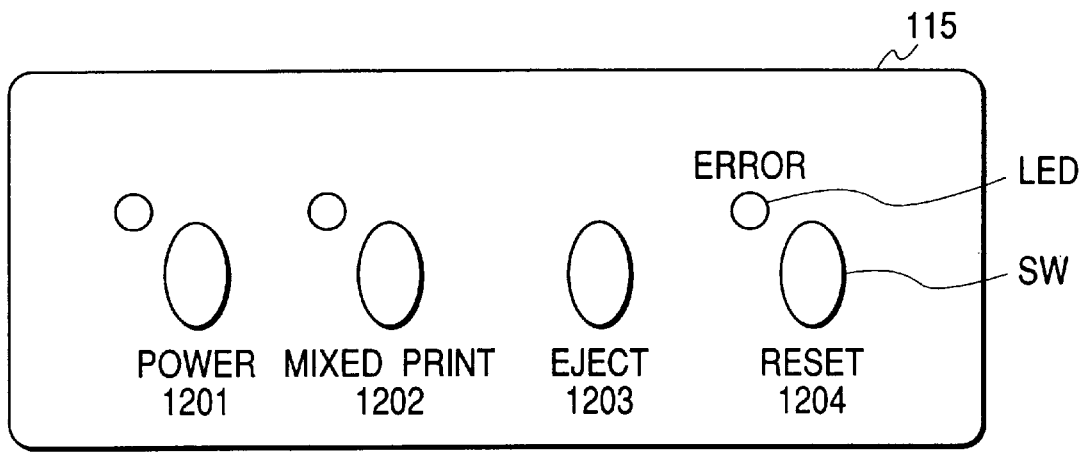
FIG. 12 is a schematic diagram showing mode changing switches of a mode setter shown in FIG. 1.

The mode setter of the print control apparatus of the fourth embodiment has, as shown in FIG. 12, a mode switch and a paper ejection switch both mounted on an operation panel, the mode switch being capable of selecting either an ordinary print mode and a mixed print mode.

With reference to FIGS. 10A to 10D, the print results using the fourth embodiment will be described.

Figure 10A:
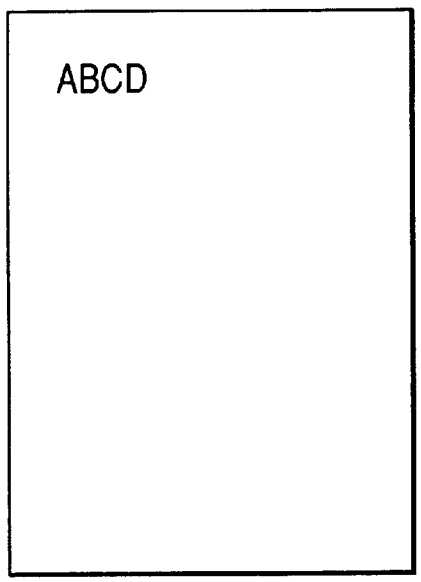
FIGS. 10A, 10B, 10C and 10D are schematic diagrams illustrating a print state of print data printed in an ordinary mode and in a mixed print mode of the invention.
Figure 10B:
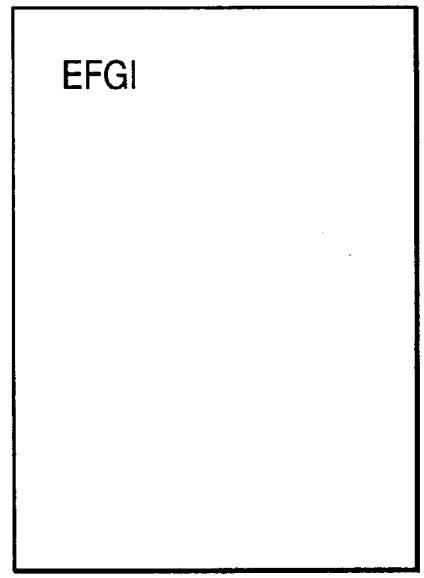
Figure 10C:
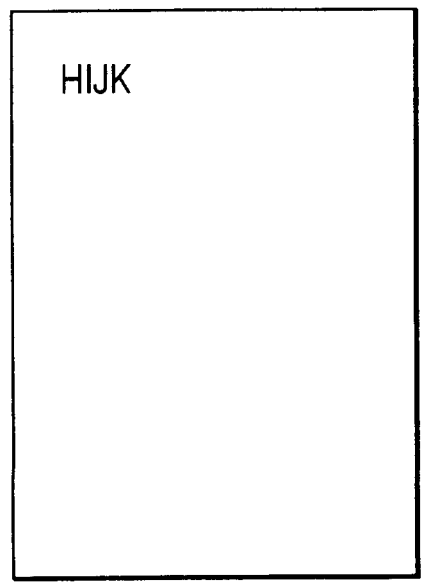
Figure 10D:
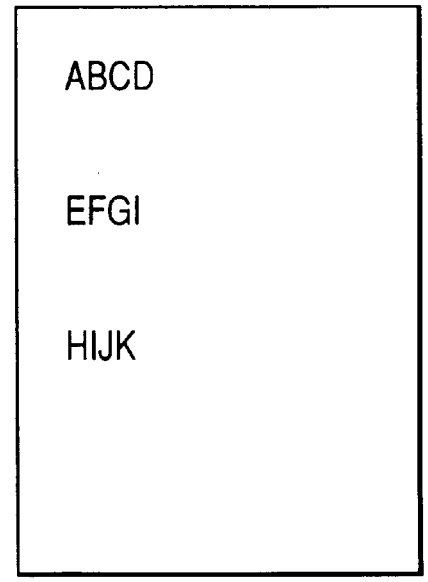

FIGS. 10A to 10C show the print results in an ordinary print mode which is a conventional or first embodiment print process. FIG. 10D shows the print results of a plurality of print data (image data) in a mixed print mode. With a conventional print control apparatus, the print process as in FIG. 10D cannot be performed. Therefore, print data shown in FIG. 10D is required to be generated by a data source such as a host computer.

Figure 13:
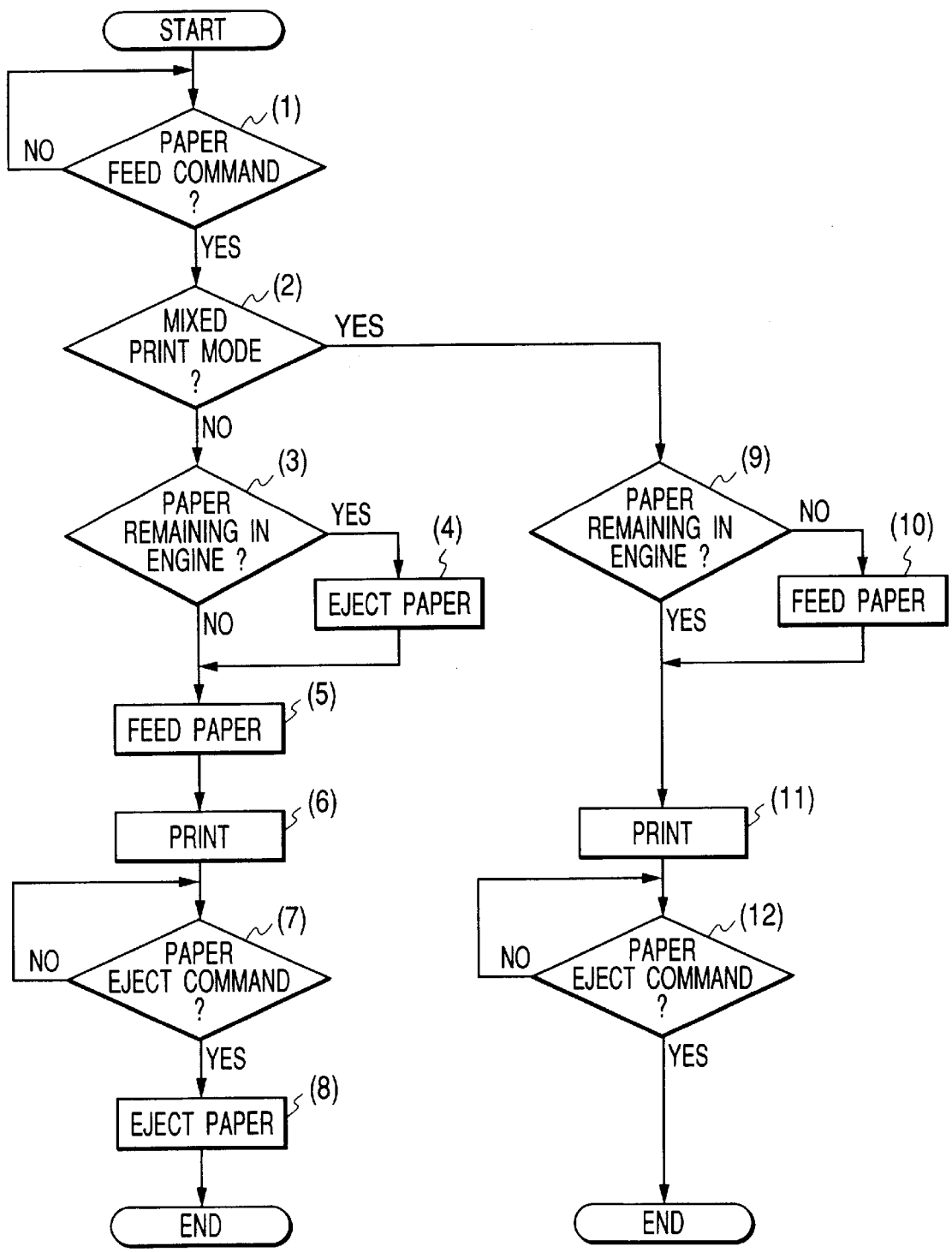
FIG. 13 is a flow chart illustrating an example of a fourth print control procedure of a print control apparatus according to a fourth embodiment of the invention.

FIG. 13 is a flow chart showing the details of the mixed print mode of the print control apparatus. (1) to (12) are steps of the mixed print mode.

At Step 1, it is checked whether a paper feed command has been transmitted. As print data including the paper feed command is transferred at Step 1, the print mode set with the mode setter 115 is checked at Step 2.

If the mixed print switch 1202 of the mode setter 115 is not selected at Step 2, i.e., if the ordinary print mode is selected, then the flow advances to Step 3. In this print control apparatus 101, as the reset switch 1204 of the mode setter 115 is selected, the ordinary print mode is selected as a default. As described previously, the mode may be set not only with the mode setter 115, but also with the host computer 102A which transmits a control command for switching between print modes.

At Step 3, the sensor 116 as a detecting means checks a presence of a recording sheet or medium. If a recording sheet is detected at Step 3, the recording sheet is ejected with the paper ejector 117 at Step 4. If a recording sheet is not detected at Step 3 or after the recording sheet is ejected at Step 4, a recording sheet is fed from the paper cassette 113 at Step 5.

At Step 6, data is printed on the recording sheet with the printer engine 112 serving as print means. It is checked at Step 7 whether a paper eject command has been transmitted. If transmitted at Step 7, the recording sheet is ejected with the paper ejector at Step 8. In the above manner, each time data is transmitted, the paper feed process, print process and paper eject process are repeated.

The above processes are performed in the ordinary print mode which is the first embodiment print processing of the print control apparatus, typically a serial printer. Next, the print processes in the mixed print mode will be described at Step 9 and following Steps.

If the mixed print switch 1202 of the mode setter 115 is selected at Step 2, i.e., if the mixed print mode is selected, the sensor checks at Step 9 a presence of a recording sheet.

If a recording sheet is not detected at Step 9, a recording sheet is fed from the paper cassette at Step 10. If a recording sheet is detected at Step 3, the flow advances to Step 11 in order to print data on the detected recording sheet by neglecting or disregarding the paper feed command transmitted at Step 1. After Step 9 or Step 10, data is printed on the recording sheet with the printer engine 112 at Step 11. It is checked at Step 12 whether the paper eject command has been transmitted or whether all the image data has been completely transmitted. If the paper eject command has been transmitted or all the image data has been completely transmitted at Step 12, the print process is terminated by neglecting the paper eject command, i.e., without ejecting the recording sheet with the paper ejector 117. In other words, the print process is terminated without ejecting the recording sheet. Thereafter, each time print data is transmitted, the print process is repeated by neglecting the paper feed command and paper eject command.

Figure 14:
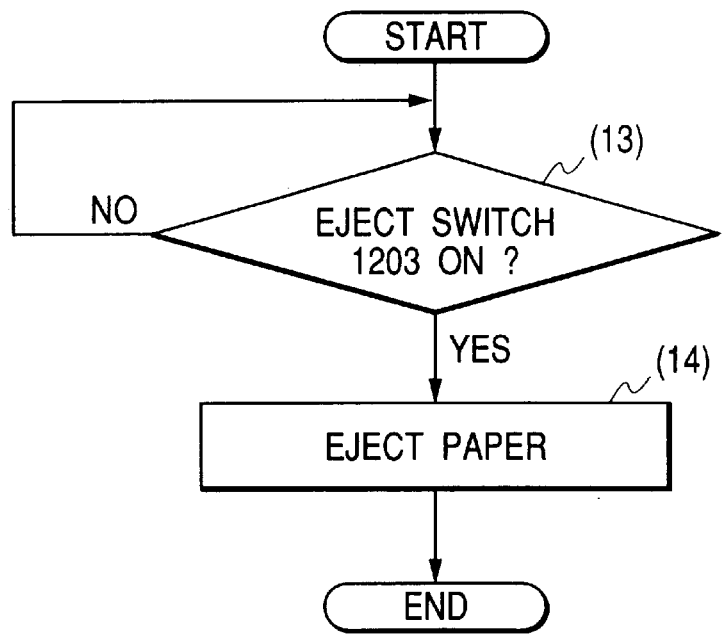
FIG. 14 is a flow chart illustrating a paper ejection control procedure of the print control apparatus according to the fourth embodiment of the invention.

In parallel with the print processes described with the flow chart of FIG. 13, the control process illustrated in the flow chart of FIG. 14 is performed. (13) and (14) are steps of the control process.

At Step 13 in FIG. 14, it is checked whether the paper eject switch 1203 of the mode setter 115 has been depressed. When CPU 110 judges that the paper eject switch 1203 has been depressed, the recording sheet is ejected with the paper ejector 117 at Step 14.

FIG. 15 illustrates the transmission operation of a printer driver of the host computer 102A to transmit three sets of the paper feed command, print data and paper eject command.

On the side of the print control apparatus 101, if the mixed print mode is set, a recording sheet is fed upon reception of a first paper feed command because in this case there is no recording sheet in the printer engine. After print data A is printed, the paper eject command is neglected or disregarded. Upon reception of the next paper feed command, this command is neglected because the recording sheet is already present. After print data B is printed, the paper eject command is neglected. Similarly, in printing print data C, the paper feed and eject commands are neglected to perform only the print process.

After the print data C is printed, the paper eject switch is depressed to eject the recording sheet printed as shown in FIG. 10D.

The printer driver of the host computer 102A performs only the same control of transferring print data as in a conventional manner, i.e., performs only the generation and transmission of print data, and the control by the print control apparatus only realizes the mixed print mode.

In printing data supplied from an apparatus without a printer driver such as a digital camera and Internet television, the mixed print mode can be realized on the side of the print control apparatus.

Figure 11B:
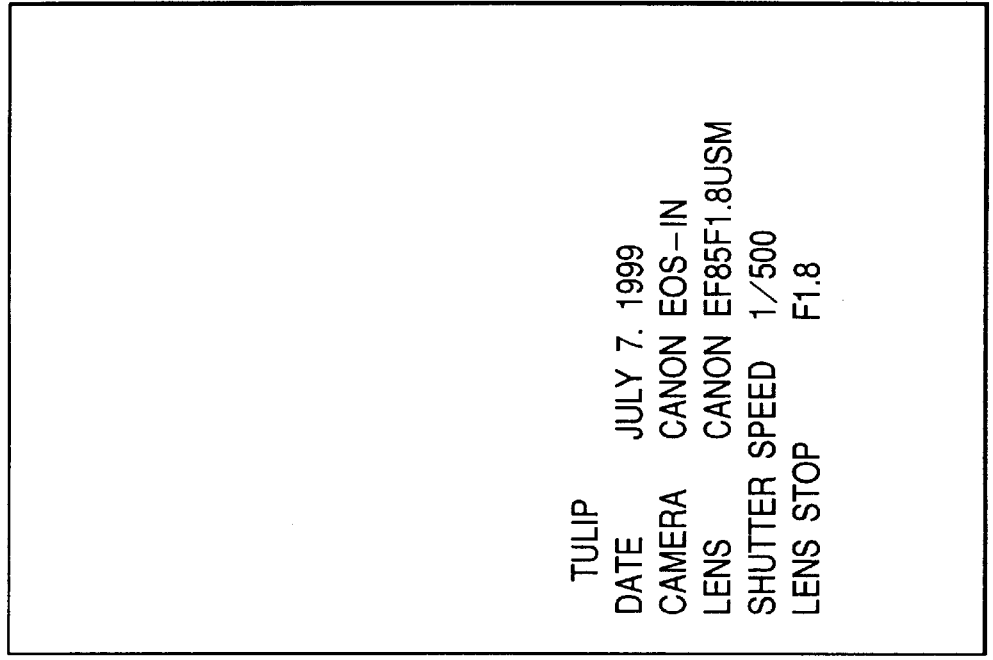
FIGS. 11A, 11B, 11C and 11D are schematic diagrams illustrating a print state of text data and image data printed in an ordinary mode and in a mixed print mode of the invention.
Figure 11A:
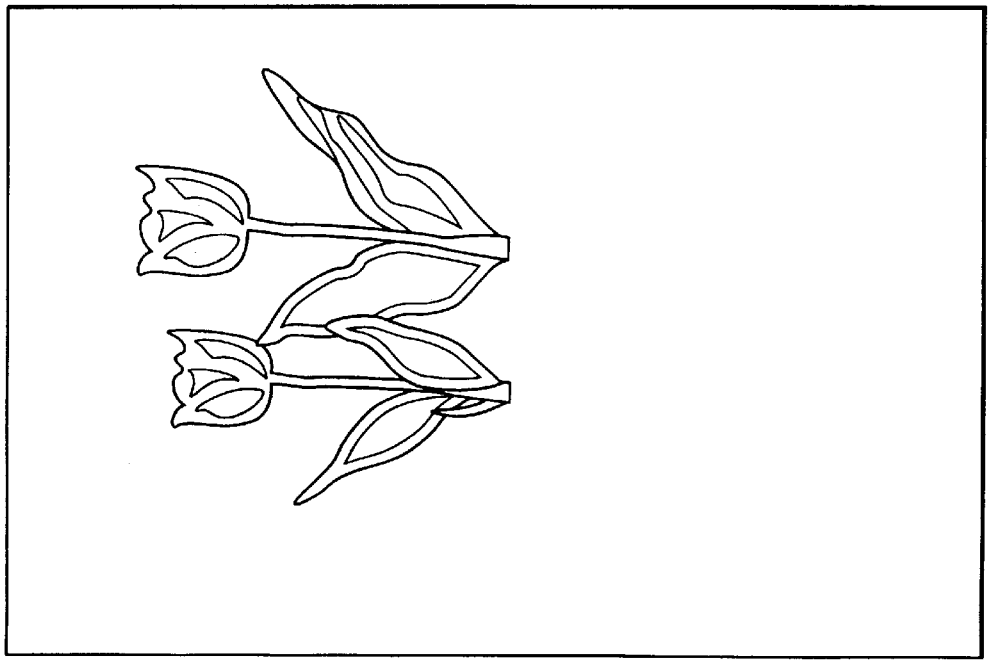
Figure 11D:
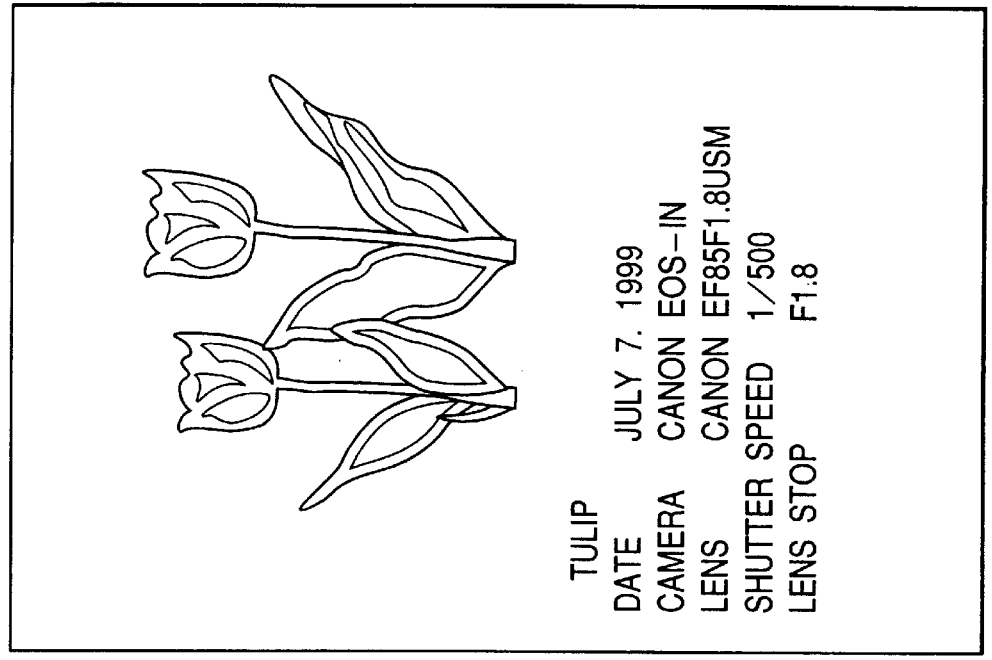
Figure 11C:
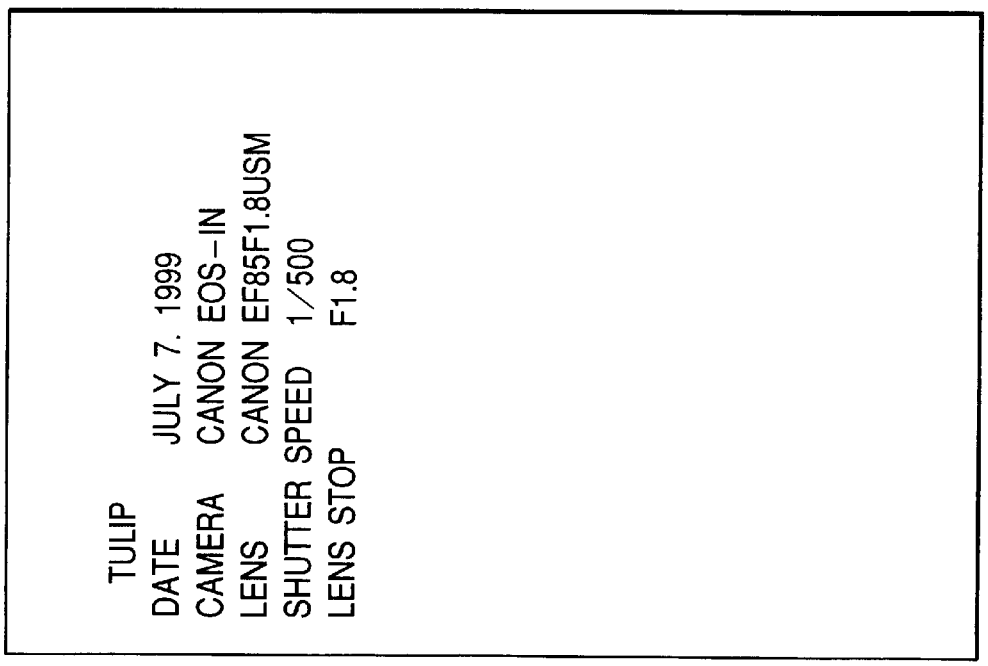

For example, after the print data such as shown in FIG. 11A supplied from the digital camera 102B is printed, the paper eject command is neglected. Since the format of the image data received from the digital camera 102B differs depending upon the specification of each digital camera, the image data input from the digital camera is developed into bit map data by the translator 106. Upon reception of a print request of print data constituted of text data such as shown in FIG. 11C supplied from the host computer 102A, the paper feed command in the print data is neglected and the print process is performed. Also the paper eject command in the print data is neglected by the print control apparatus 101. As CPU judges that the paper eject switch 1203 has been depressed, the recording sheet with mixed images such as shown in FIG. 11D is ejected with the paper ejector 117. In the above manner, a user can easily form a mixed image.

As above, according to the fourth embodiment, for example, after print data from the host computer is printed, print data from another data source (such as a host computer and a digital camera) is mixed and printed on the same recording sheet, without ejecting it, and the recording sheet can be ejected at a timing when a user depresses the paper eject switch.

With reference to FIGS. 1 and 10A to 10D, the print control apparatus characteristic of this embodiment will be described.

The print control apparatus constructed as above comprises: interface means (interface 103A or 103B) for receiving data from an external apparatus; analyzing means (translator 106) for analyzing the data received by the interface means; print means (printer engine 112) for printing bit map data on a recording medium (recording sheet) in accordance with analyzed results of the analyzing means; and setting means (mixed print switch 1202 of the mode setter 115) for setting a first mode (mixed print mode) of discarding a paper ejection command if the analyzed results of the analyzing means indicate the paper ejection command. Accordingly, a print environment can be configured in which a plurality of print data can be printed mixedly in the same recording sheet in accordance with a print mode set by a user.

The print control apparatus further comprises detecting means (sensor 116) for detecting whether the recording medium remains on a transport unit of the print means (printer engine 112), wherein when data is received by the interface means (interface 103A or 103B) in the first mode (mixed print mode) set by the setting means (mode setter 115), the data is printed on the recording medium with the print means if the detecting means detects that the recording medium remains, whereas the data is printed on a next fed recording medium if the detecting means detects that the recording medium does not remain. Accordingly, a print environment can be configured in which when a recording sheet is not detected in the mixed print mode, a new recording sheet is fed and thereafter print data is printed.

In the print control apparatus, a plurality of interface means are provided and exchanged upon reception of data. Accordingly, a print environment can be configured in which print data supplied from different interfaces can be printed mixedly.

In the print control apparatus, the setting means (mode setter 115) sets a second mode (ordinary print mode) of ejecting the recording medium in accordance with a paper ejection command if the analyzed results of the analyzing means (translator 106) indicate the paper ejection command. Accordingly, a print environment can be configured in which an ordinary print process can be performed.

In the print control apparatus, when data is received by the interface means (interface 103A or 103B) in the second mode (ordinary print mode) set by the setting means (mode setter 115), the data is printed on a next recording medium with the print means (printer engine 112) by ejecting the recording medium if the detecting means (sensor 116) detects that the recording medium remains. Accordingly, a print environment can be configured in which print data is not printed mixedly inadvertently on the same recording sheet.

The print control apparatus further comprises paper ejection instructing means (paper eject switch 1203) for instructing to eject the recording paper out of a transport unit of the print means (printer engine 112), wherein in the first mode (mixed print mode), the recording medium is ejected if a paper ejection is instructed by the paper ejection instructing means or if a print area of the recording medium becomes insufficient. Accordingly, a print environment can be configured in which a mixedly printed recording sheet can be ejected at a timing designated by a user.

Methods of controlling the above means are intended to be included in this embodiment, and various storage media to be described later, the media storing control programs for controlling the above means, are also intended to be included in this embodiment.

Next, the structure of a data processing program readable by a print control apparatus of this invention will be described with reference to a memory map shown in FIG. 8.

FIG. 8 is a memory map of a storage medium for storing various data processing programs readable by the print control apparatus of the invention.

Although not specifically shown in FIG. 8, information of the management of program groups stored in the storage medium, such as version information and program authors, may be stored. Information of OS (operating system) and the like on the program reading side, such as an icon for displaying a program in a discriminated manner, may be stored.

Data belonging to each program is also managed by directory information. A program for installing each program into a computer may be stored, or a program for melting a compressed install program may also be stored.

A host computer may realize the functions of the embodiments shown in FIGS. 3 to 7 by using externally installed programs. In this case, the invention is intended to be applicable to the case wherein an output apparatus is provided with information including such programs supplied from an internal storage medium such as a CD-ROM, a flash memory and an FD or from an external storage medium accessed via a network.

The scope of the invention also includes a system or apparatus whose computer (CPU or MPU) runs to operate various devices connected thereto in accordance with software program codes stored in a storage medium and supplied to the system or apparatus so as to realize the functions of the above embodiments.

In this case, the software program codes themselves read from the storage medium realize the novel embodiment functions of the invention. Therefore, the storage medium storing the program codes themselves constitute the present invention.

The storage medium storing such program codes may be a floppy disk, a hard disk, an optical disk, a magneto-optical disk, a CD-ROM, a CD-R, a magnetic tape, a non-volatile memory card, a ROM and an EEPROM.

Obviously, such program codes are other types of embodiments of this invention, not only for the case wherein the embodiment functions are realized by executing the program codes supplied to the computer but also for the case wherein the embodiment functions are realized by the program codes used with an OS of the computer which executes part or the whole of the actual tasks.

Furthermore, the scope of the invention also includes obviously the case wherein in accordance with the program codes stored in a memory of a function expansion board or unit connected to the computer supplied with the program codes, a CPU or the like of the function board or unit executes part or the whole of the actual tasks for realizing the embodiment functions.

As described so far, according to the first and second aspects of the present invention, the print control apparatus comprises: a plurality of interface means for receiving print information from information processing apparatuses via a predetermined communications medium; detecting means for detecting, after first print information received by one interface means is printed on a fed first recording medium with a printer engine whether the first recording medium has been ejected; first setting means for setting a first print mode for ejecting the first recording medium and printing second print information on a fed second recording medium, if the detecting means detects that the first recording medium remains in the printer engine at the time when the second print information is received by another interface means; and control means for controlling to execute either a mixed print process or an independent print process in accordance with the set state of the first print mode set by the first setting means, the mixed print process printing the second print information received by the other interface means on the fed first recording medium, and the independent print process printing the second print information on the second recording medium to be fed after the first recording medium is ejected. Accordingly, the first print information received via one interface means and the second print information received via another interface means after the first print information is printed can be mixedly or independently printed in accordance with a print mode set by a user. A print environment can therefore be configured with ease.

According to the third and fourth aspects of the present invention, the print control apparatus comprises: a plurality of interface means for receiving print information from information processing apparatuses via a predetermined communications medium; detecting means for detecting, after first print information received by one interface means is printed on a fed first recording medium with a printer engine, whether the first recording medium has been ejected; second setting means for setting a second print mode for ejecting the first recording medium and printing second print information on a fed second recording medium, if the detecting means detects that the first recording medium remains in the printer engine at the time when the second print information is received by the same interface means after a predetermined time lapse after the first print information is printed; and control means for controlling to execute either a mixed print process or an independent print process in accordance with the set state of the second print mode set by the second setting means, the mixed print process printing the second print information received by another interface means on the fed first recording medium, and the independent print process printing the second print information on the second recording medium to be fed after the first recording medium is ejected. Accordingly, the first print information received via one interface means and the second print information received via the same interface means after the predetermined time lapse after the first print information is printed can be mixedly or independently printed in accordance with a print mode set by a user. A print environment can therefore be configured with ease.

According to the fifth and sixth aspects of the present invention, the print control apparatus comprises: a plurality of interface means for receiving print information from information processing apparatuses via a predetermined communications medium; detecting means for detecting, after first print information received by one interface means is printed on a fed first recording medium with a printer engine, whether the first recording medium has been ejected; third setting means for setting a third print mode for ejecting the first recording medium and printing second print information on a fed second recording medium, if the detecting means detects that the first recording medium remains in the printer engine at the time when the second print information is received by another interface means after a predetermined time lapse after the first print information is printed; and control means for controlling to execute either a mixed print process or an independent print process in accordance with the set state of the third print mode set by the third setting means, the mixed print process printing the second print information received by the other interface means on the fed first recording medium, and the independent print process printing the second print information on the second recording medium to be fed after the first recording medium is ejected. Accordingly, the first print information received via one interface means and the second print information received via another interface means after the predetermined time lapse after the first print information is printed can be mixedly or independently printed in accordance with a print mode set by a user. A print environment can therefore be configured with ease.

According to the seventh and eighth aspects of the present invention, the print control method comprises: after first print information received by one interface means is printed on a fed first recording medium with the printer engine, a detecting step of detecting whether the first recording medium has been ejected; a checking step of checking a set state of a first print mode for ejecting the first recording medium and printing second print information on a fed second recording medium, if the detecting step detects that the first recording medium remains in the printer engine at the time when the second print information is received by another interface means; a first print step of executing a mixed print process in accordance with the checked set state of the first print mode, the mixed print process printing the second print information received by the other interface means on the fed first recording medium; and a second print step of executing an independent print process in accordance with the checked set state of the first print mode, the independent print process printing the second print information on the second recording medium to be fed after the first recording medium is ejected. Accordingly, the first print information received via one interface means and the second print information received via another interface means after the first print information is printed can be mixedly or independently printed in accordance with a print mode set by a user. A print environment can therefore be configured with ease.

According to the ninth and tenth aspects of the present invention, the print control method comprises: after first print information received by one interface means is printed on a fed first recording medium with the printer engine, a detecting step of detecting whether the first recording medium has been ejected; a checking step of checking a set state of a second print mode for ejecting the first recording medium and printing second print information on a fed second recording medium, if the detecting step detects that the first recording medium remains in the printer engine at the time when the second print information is received by the same interface means after a predetermined time lapse after the first print information is printed; a first print step of executing a mixed print process in accordance with the checked set state of the second print mode, the mixed print process printing the second print information received by the other interface means on the fed first recording medium; and a second print step of executing an independent print process in accordance with the checked set state of the second print mode, the independent print process printing the second print information on the second recording medium to be fed after the first recording medium is ejected. Accordingly, the first print information received via one interface means and the second print information received via the same interface means after the predetermined time lapse after the first print information is printed can be mixedly or independently printed in accordance with a print mode set by a user. A print environment can therefore be configured with ease.

According to the eleventh and twelfth aspects of the present invention, the print control method comprises: after first print information received by one interface means is printed on a fed first recording medium with the printer engine, a detecting step of detecting whether the first recording medium has been ejected; a checking step of checking a set state of a second print mode for ejecting the first recording medium and printing second print information on a fed second recording medium, if the detecting step detects that the first recording medium remains in the printer engine at the time when the second print information is received by another interface means after a predetermined time lapse after the first print information is printed; a first print step of executing a mixed print process in accordance with the checked set state of the second print mode, the mixed print process printing the second print information received by the other interface means on the fed first recording medium; and a second print step of executing an independent print process in accordance with the checked set state of the second print mode, the independent print process printing the second print information received by the other interface means on the second recording medium to be fed after the first recording medium is ejected. Accordingly, the first print information received via one interface means and the second print information received via another interface means after the predetermined time lapse after the first print information is printed can be mixedly or independently printed in accordance with a print mode set by a user. A print environment can therefore be configured with ease.

According to the thirteenth aspect of the present invention, a print environment can be configured in which if a recording sheet remains in the printer engine when the paper feed command is transmitted, it is possible to select either printing the print data on the same recording sheet or printing the print data on a new recording sheet after ejecting the previous recording sheet, in accordance with a selected print mode.

What is claimed is:

1. A print control apparatus that includes a plurality of input circuits each adapted for inputting print information, said print control apparatus comprising:

a print process circuit adapted for executing a mixed print process, in which a plurality of pieces of print information is printed on one recording medium, or an independent print process, in which the plurality of pieces of print information is printed on respective recording media;

an operation setting circuit adapted for setting a process mode to indicate one of the mixed print process and the independent print process; and a control circuit adapted for controlling said print process circuit based on the process mode set by said operation setting circuit, wherein, when the set process mode is a first mode, said control circuit controls said print process circuit to execute the mixed print process if the plurality of pieces of print information is input by respective ones of the plurality of input circuits, and to execute the independent print process if the plurality of pieces of print information is input by a same one of the plurality of input circuits.

2. An apparatus according to claim 1, wherein, when the set process mode is a second mode, said control circuit controls said print process circuit to execute the independent print process if the plurality of pieces of print information is input by the respective ones of the plurality of input circuits, and to execute the mixed print process if the plurality of pieces of print information is input by a same one of the plurality of input circuits.

3. An apparatus according to claim 1, wherein, when the set process mode is a third mode, said control circuit controls said print process circuit to execute the mixed print process if the plurality of pieces of print information is input by the respective ones of the plurality of input circuits, and to execute the mixed print process even if the plurality of pieces of print information is input by a same one of the plurality of input circuits.

4. An apparatus according to claim 1, wherein, when the set process mode is a fourth mode, said control circuit controls said print process circuit to execute the independent print process if the plurality of pieces of print information is input by the respective ones of the plurality of input circuits, and to execute the independent print process even if the plurality of pieces of print information is input by a same one of the plurality of input circuits.

5. An apparatus according to claim 1, further comprising a detector circuit adapted for detecting whether a recording medium for a previous print process performed by said print process circuit has been ejected, wherein, if said detector circuit detects in the independent print process that the recording medium has not been ejected, said print process circuit ejects the recording medium and then executes a next print process.

6. An apparatus according to claim 1, wherein said print process circuit ignores a paper ejection command included in the print information in executing the mixed print process.

7. An apparatus according to claim 1, wherein one of the plurality of input circuits is connected to a digital camera.

8. An apparatus according to claim 2, further comprising a timer circuit adapted for measuring a time from reception of a piece of print information to reception of a next piece of print information, wherein, when the measured time is shorter than a prescribed time, said control circuit controls, in the second mode, said print process circuit to execute the mixed print process if the plurality of pieces of print information is input by a same one of the plurality of input circuits.

9. A method for a print control apparatus that includes a plurality of input circuits each adapted for inputting print information, said method comprising the steps of:

executing one of a mixed print process, in which a plurality of pieces of print information is printed on one recording medium, and an independent print process, in which the plurality of pieces of print information is printed on respective recording media;

setting a process mode to indicate one of the mixed print process and the independent print process; and controlling said executing step based on the process mode set in said setting step, wherein, when the set process mode is a first mode, said controlling step controls said executing step to execute the mixed print process if the plurality of pieces of print information is input by respective ones of the plurality of input circuits, and to execute the independent print process if the plurality of pieces of print information is input by a same one of the plurality of input circuits.

10. A method according to claim 9, wherein, when the set process mode is a second mode, said controlling step controls said executing step to execute the independent print process if the plurality of pieces of print information is input by the respective ones of the plurality of input circuits, and to execute the mixed print process if the plurality of pieces of print information is input by a same one of the plurality of input circuits.

11. A method according to claim 9, wherein, when the set process mode is a third mode, said controlling step controls said executing step to execute the mixed print process if the plurality of pieces of print information is input by the respective ones of the plurality of input circuits, and to execute the mixed print process even if the plurality of pieces of print information is input by a same one of the plurality of input circuits.

12. A method according to claim 9, wherein, when the set process mode is a fourth mode, said controlling step controls said executing step to execute the independent print process if the plurality of pieces of print information is input by the respective ones of the plurality of input circuits, and to execute the independent print process even if the plurality of pieces of print information is input by a same one of the plurality of input circuits.

13. A method according to claim 9, further comprising the step of detecting whether a recording medium for a previous print process performed by said executing step has been ejected, wherein, if said detecting step detects in the independent print process that the recording medium has not been ejected, said executing step ejects the recording medium and then executes a next print process.

14. A method according to claim 9, wherein said executing step ignores a paper ejection command included in the print information in executing the mixed print process.

15. A method according to claim 9, wherein one of the plurality of input circuits is connected to a digital camera.

16. A method according to claim 10, further comprising the step of measuring a time from reception of a piece of print information to reception of a next piece of print information, wherein, when the measured time is shorter than a prescribed time, said controlling step controls, in the second mode, said executing step to execute the mixed print process if the plurality of pieces of print information is input by a same one of the plurality of input circuits.

17. A computer-readable memory medium storing a program for implementing a method for a print control apparatus that includes a plurality of input circuits each adapted for inputting print information, the program comprising:

code for an executing step of executing one of a mixed print process, in which a plurality of pieces of print information is printed on one recording medium, and an independent print process, in which the plurality of pieces of print information is printed on respective recording media;

code for a setting step of setting a process mode to indicate one of the mixed print process and the independent print process; and code for a controlling step of controlling the executing step based on the process mode set by the setting step, wherein, when the set process mode is a first mode, the controlling step controls the executing step to execute the mixed print process if the plurality of pieces of print information is input by respective ones of the plurality of input circuits, and to execute the independent print process if the plurality of pieces of print information is input by a same one of the plurality of input circuits.

18. A medium according to claim 17, wherein, when the set process mode is a second mode, the controlling step controls the executing step to execute the independent print process if the plurality of pieces of print information is input by the respective ones of the plurality of input circuits, and to execute the mixed print process if the plurality of pieces of print information is input by a same one of the plurality of input circuits.

19. A medium according to claim 17, wherein, when the set process mode is a third mode, the controlling step controls the executing step to execute the mixed print process if the plurality of pieces of print information is input by the respective ones of the plurality of input circuits, and to execute the mixed print process even if the plurality of pieces of print information is input by a same one of the plurality of input circuits.

20. A medium according to claim 17, wherein, when the set process mode is a fourth mode, the controlling step controls the executing step to execute the independent print process if the plurality of pieces of print information is input by the respective ones of the plurality of input circuits, and to execute the independent print process even if the plurality of pieces of print information is input by a same one of the plurality of input circuits.

21. A medium according to claim 17, wherein the program further comprises code for a detecting step of detecting whether a recording medium for a previous print process performed by the executing step has been ejected, wherein, if the detecting step detects in the independent print process that the recording medium has not been ejected, the executing step ejects the recording medium and then executes a next print process.

22. A medium according to claim 17, wherein the executing step ignores a paper ejection command included in the print information in executing the mixed print process.

23. A medium according to claim 17, wherein one of the plurality of input circuits is connected to a digital camera.

24. A medium according to claim 18, wherein the program further comprises code for a measuring step of measuring a time from reception of a piece of print information to reception of a next piece of print information, wherein, when the measured time is shorter than a prescribed time, the controlling step controls, in the second mode, the executing step to execute the mixed print process if the plurality of pieces of print information is input by a same one of the plurality of input circuits.

25. A print control apparatus that includes a plurality of input circuits each adapted for inputting print information, said print control apparatus comprising:

a print process circuit adapted for executing a mixed print process, in which a plurality of pieces of print information is printed on one recording medium, or an independent print process, in which the plurality of pieces of print information is printed on respective recording media;

an operation setting circuit adapted for setting a process mode to indicate one of the mixed print process and the independent print process; and a control circuit adapted for controlling said print process circuit based on the process mode set by said setting circuit, wherein, when the set process mode is a first mode, said control circuit controls said print process circuit to execute the independent print process if the plurality of pieces of print information is input by respective ones of the plurality of input circuits, and to execute the mixed print process if the plurality of pieces of print information is input by a same one of the plurality of input circuits.

26. An apparatus according to claim 25, wherein, when the set process mode is a second mode, said control circuit controls said print process circuit to execute the mixed print process if the plurality of pieces of print information is input by the respective ones of the plurality of input circuits, and to execute the independent print process if the plurality of pieces of print information is input by a same one of the plurality of input circuits.

27. An apparatus according to claim 25, wherein, when the set process mode is a third mode, said control circuit controls said print process circuit to execute the mixed print process if the plurality of pieces of print information is input by the respective ones of the plurality of input circuits, and to execute the mixed print process even if the plurality of pieces of print information is input by a same one of the plurality of input circuits.

28. An apparatus according to claim 25, wherein, when the set process mode is a fourth made, said control circuit controls said print process circuit to execute the independent print process if the plurality of pieces of print information is input by the respective ones of the plurality of input circuits, and to execute the independent print process even if the plurality of pieces of print information is input by a same one of the plurality of input circuits.

29. An apparatus according to claim 25, further comprising a detector circuit adapted for detecting whether a recording medium for a previous print process performed by said print process circuit has been ejected, wherein, if said detector circuit detects in the independent print process that the recording medium has not been ejected, said print process circuit ejects the recording medium and then executes a next print process.

30. An apparatus according to claim 25, wherein said print process circuit ignores a paper ejection command included in the print information in executing the mixed print process.

31. An apparatus according to claim 25, wherein one of the plurality of input circuits is connected to a digital camera.

32. An apparatus according to claim 26, further comprising a timer circuit adapted for measuring a time from reception of a piece of print information to reception of a next piece of print information, wherein, when the measured time is shorter than a prescribed time, said control circuit controls in the second mode said print process circuit to execute the mixed print process if the plurality of pieces of print information is input by a same one of the plurality of input circuits.

33. A method for a print control apparatus that includes a plurality of input circuits each adapted for inputting print information, said method comprising the steps of:

executing a mixed print process, in which a plurality of pieces of print information is printed on one recording medium, or an independent print process, in which the plurality of pieces of print information is printed on respective recording media;

setting a process mode to indicate one of the mixed print process and the independent print process; and controlling said executing step based on the process mode set in said setting step, wherein, when the set process mode is a first mode, said controlling step controls said executing step to execute the independent print process if the plurality of pieces of print information is input by respective ones of the plurality of input circuits, and to execute the mixed print process if the plurality of pieces of print information is input by a same one of the plurality of input circuits.

34. A method according to claim 33, wherein, when the set process mode is a second mode, said controlling step controls said executing step to execute the mixed print process if the plurality of pieces of print information is input by the respective ones of the plurality of input circuits, and to execute the independent print process if the plurality of pieces of print information is input by a same one of the plurality of input circuits.

35. A method according to claim 33, wherein, when the set process mode is a third mode, said controlling step controls said executing step to execute the mixed print process if the plurality of pieces of print information is input by the respective ones of the plurality of input circuits, and to execute the mixed print process even if the plurality of pieces of print information is input by a same one of the plurality of input circuits.

36. A method according to claim 33, wherein, when the set process mode is a fourth mode, said controlling step controls said executing step to execute the independent print process if the plurality of pieces of print information is input by the respective ones of the plurality of input circuits, and to execute the independent print process even if the plurality of pieces of print information is input by a same one of the plurality of input circuits.

37. A method according to claim 33, further comprising the step of detecting whether a recording medium for a previous print process performed by said executing step has been ejected, wherein, if said detecting step detects in the independent print process that the recording medium has not been ejected, said executing step ejects the recording medium and then executes a next print process.

38. A method according to claim 33, wherein said executing step ignores a paper ejection command included in the print information in executing the mixed print process.

39. A method according to claim 33, wherein one of the plurality of input circuits is connected to a digital camera.

40. A method according to claim 34, further comprising the step of measuring a time from reception of a piece of print information to reception of a next piece of print information, wherein, when the measured time is shorter than a prescribed time, said controlling step controls in the second mode said executing step to execute the mixed print process if the plurality of pieces of print information is input by a same one of the plurality of input circuits.

41. A computer-readable recording medium storing a program for implementing a method for a print control apparatus that includes a plurality of input circuits each adapted for inputting print information, the program comprising:

code for an executing step of executing a mixed print process, in which a plurality of pieces of print information is printed on one recording medium, or an independent print process, in which the plurality of pieces of print information is printed on respective recording media;

code for a setting step of setting a process mode to indicate one of the mixed print process and the independent print process; and code for a controlling step of controlling the executing step based on the process mode set by the setting step, wherein, when the set process mode is a first mode, the controlling step controls the executing step to execute the independent print process if the plurality of pieces of print information is input by respective ones of the plurality of input circuits, and to execute the mixed print process if the plurality of pieces of print information is input by a same one of the plurality of input circuits.

42. A medium according to claim 41, wherein, when the set process mode is a second mode, the controlling step controls the executing step to execute the mixed print process if the plurality of pieces of print information is input by the respective ones of the plurality of input circuits, and to execute the independent print process if the plurality of pieces of print information is input by a same one of the plurality of input circuits.

43. A medium according to claim 41, wherein, when the set process mode is a third mode, the controlling step controls the executing step to execute the mixed print process if the plurality of pieces of print information is input by the respective ones of the plurality of input circuits, and to execute the mixed print process even if the plurality of pieces of print information is input by a same one of the plurality of input circuits.

44. A medium according to claim 41, wherein, when the set process mode is a fourth mode, the controlling step controls the executing step to execute the independent print process if the plurality of pieces of print information is input by the respective ones of the plurality of input circuits, and to execute the independent print process even if the plurality of pieces of print information is input by a same one of the plurality of input circuits.

45. A medium according to claim 41, wherein the program further comprises a detecting step of detecting whether a recording medium for a previous print process performed by the executing step has been ejected, wherein, if the detecting step detects in the independent print process that the recording medium has not been ejected, the executing step ejects the recording medium and then executes a next print process.

46. A medium according to claim 41, wherein the executing step ignores a paper ejection command included in the print information in executing the mixed print process.

47. A medium according to claim 41, wherein one of the plurality of input circuits is connected to a digital camera.

48. A medium according to claim 42, wherein the program further comprises a measuring step of measuring a time from reception of a piece of print information to reception of a next piece of print information, wherein, when the measured time is shorter than a prescribed time, the controlling step controls in the second mode the executing step to execute the mixed print process if the plurality of pieces of print information is input by a same one of the plurality of input circuits.

* * * * *

UNITED STATES PATENT AND TRADEMARK OFFICE
CERTIFICATE OF CORRECTION

PATENT NO. : 6,181,434 B1
DATED : January 30, 2001
INVENTOR(S) : Masashi Matsumoto It is certified that error appears in the above-identified patent and that said Letters Patent is hereby corrected as shown below:

Title page,
Item [54], Title
"PRINT CONTROL APPARATUS AND METHOD AND STORAGE MEDIUM STORING COMPUTER READABLE PROGRAMS" should read -- PRINT CONTROL APPARATUS AND METHOD FOR CONTROLLING A PRINTING OPERATION BASED ON A SET PROCESS MODE, AND COMPUTER READABLE STORAGE MEDIUM STORING A PROGRAM THEREFOR --.

Column 1,
Lines 1-4, "PRINT CONTROL APPARATUS AND METHOD AND STORAGE MEDIUM STORING COMPUTER READABLE PROGRAMS" should read -- PRINT CONTROL APPARATUS AND METHOD FOR CONTROLLING A PRINTING OPERATION BASED ON A SET PROCESS MODE, AND COMPUTER READABLE STORAGE MEDIUM STORING A PROGRAM THEREFOR --.

Column 2,
Line 24, "wherein a" should read -- wherein in a --.

Column 7,
Line 28, "engine" should read -- engine, --.
Line 29, ", wherein" should read -- wherein --.

Column 9,
Line 65, "later given." should read -- given later. --.

Column 10,
Line 13, "from" should be deleted.

Column 11,
Line 40, "in formation" should read -- information --.

Column 15,
Lines 29, 39 and 47, "indicates" should read -- indicate --.

UNITED STATES PATENT AND TRADEMARK OFFICE
CERTIFICATE OF CORRECTION

PATENT NO. : 6,181,434 B1
DATED : January 30, 2001
INVENTOR(S) : Masashi Matsumoto It is certified that error appears in the above-identified patent and that said Letters Patent is hereby corrected as shown below:

Column 26,
Line 45, "made," should read -- mode, --.

Signed and Sealed this

Second Day of April, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,181,434 B1
DATED : January 30, 2001
INVENTOR(S) : Masashi Matsumoto It is certified that error appears in the above-identified patent and that said Letters Patent is hereby corrected as shown below:

<u>Title page, Item [54] and Column 1, lines 1-4,</u>
Title, "PRINT CONTROL APPARATUS AND METHOD AND STORAGE MEDIUM STORING COMPUTER READABLE PROGRAMS" should read
-- PRINT CONTROL APPARATUS AND METHOD FOR CONTROLLING A PRINTING OPERATION BASED ON A SET PROCESS MODE, AND COMPUTER READABLE STORAGE MEDIUM STORING A PROGRAM THEREFOR --.

Signed and Sealed this

Fifteenth Day of November, 2005

JON W. DUDAS
*Director of the United States Patent and Trademark Office*